United States Patent
Morikawa et al.

(10) Patent No.: US 9,134,831 B2
(45) Date of Patent: Sep. 15, 2015

(54) INPUT APPARATUS

(71) Applicant: DENSO CORPORATION, Kariya, Aichi-pref. (JP)

(72) Inventors: Shohei Morikawa, Ichinomiya (JP); Takeshi Kawashima, Nisshin (JP); Hirotaka Goto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 152 days.

(21) Appl. No.: 13/752,805

(22) Filed: Jan. 29, 2013

(65) Prior Publication Data

US 2013/0194216 A1  Aug. 1, 2013

(30) Foreign Application Priority Data

Jan. 31, 2012  (JP) ................. 2012-017791

(51) Int. Cl.
  *G06F 3/041* (2006.01)
  *G06F 3/0488* (2013.01)

(52) U.S. Cl.
  CPC .............. *G06F 3/041* (2013.01); *G06F 3/0488* (2013.01)

(58) Field of Classification Search
  CPC ........................................................ G06F 3/041
  USPC .................................................. 345/173–175
  See application file for complete search history.

(56) References Cited

U.S. PATENT DOCUMENTS

| | | | | |
|---|---|---|---|---|
| 7,453,439 | B1 * | 11/2008 | Kushler et al. ................. | 345/168 |
| 2008/0231608 | A1 * | 9/2008 | Nagata ........................... | 345/173 |
| 2010/0079413 | A1 * | 4/2010 | Kawashima et al. .......... | 345/175 |
| 2010/0194713 | A1 * | 8/2010 | Kawashima et al. .......... | 345/175 |
| 2010/0277438 | A1 * | 11/2010 | Kawashima et al. .......... | 345/175 |
| 2011/0050566 | A1 | 3/2011 | Sawai | |
| 2011/0279396 | A1 * | 11/2011 | Wakai et al. ................... | 345/173 |
| 2011/0285657 | A1 * | 11/2011 | Shimotani et al. ............. | 345/173 |
| 2011/0298743 | A1 * | 12/2011 | Machida et al. ............... | 345/173 |
| 2012/0044151 | A1 * | 2/2012 | Wilson et al. .................. | 345/173 |
| 2012/0194518 | A1 * | 8/2012 | Inada ............................. | 345/427 |
| 2013/0069883 | A1 * | 3/2013 | Oga ................................ | 345/172 |
| 2014/0184538 | A1 * | 7/2014 | Sato et al. ...................... | 345/173 |
| 2014/0283019 | A1 * | 9/2014 | Sato et al. ....................... | 726/19 |

FOREIGN PATENT DOCUMENTS

| | | |
|---|---|---|
| JP | 2010-072840 | 4/2010 |
| JP | 2011-018228 | 1/2011 |
| JP | 2011-070554 | 4/2011 |
| JP | 2011-100381 | 5/2011 |
| JP | 2011-123750 | 6/2011 |

* cited by examiner

*Primary Examiner* — Kumar Patel
*Assistant Examiner* — Sejoon Ahn
(74) *Attorney, Agent, or Firm* — Harness, Dickey & Pierce, PLC

(57) ABSTRACT

An input apparatus for, in response to a user's sliding operation on an operation surface, inputting a coordinate point in the operation surface to move a pointing image to a target button image is disclosed. The apparatus acquires the coordinate point in the operation surface and sets, as a characteristic line, a tendency of trace of the coordinate point in the user's sliding operation directed to a lateral direction or a longitudinal direction of the operation surface. The apparatus corrects the coordinate point with reference to the set characteristic line so that the trace of the coordinate point is corrected to be a horizontal line or a vertical line. The apparatus outputs the corrected coordinate point for moving the pointing image.

13 Claims, 12 Drawing Sheets

INPUT APPARATUS

CROSS REFERENCE TO RELATED APPLICATION

The present application is based on Japanese Patent Application No. 2012-17791 filed on Jan. 31, 2012, disclosure of which is incorporated herein by reference.

TECHNICAL FIELD

The present disclosure relates to an input apparatus.

BACKGROUND

An input apparatus such as a touch pad or the like for operating a pointer displayed on a display screen is known (see Patent Document 1).

The input apparatus of Patent Document 1 improves a pointer operation feeling by correcting the inputted coordinate point so that against a circle-like input operation, a detection characteristic of the input apparatus becomes close to a circular characteristic.

Patent Document 1: JP 2011-100381A

When a user selects his or her desired button image from among multiple button images aligned along a horizontal line or a vertical line, the user moves a pointer or cursor to the target button image by moving his or her fingertip along a button image alignment direction and performs a selection operation.

However, when the user performs a sliding operation on an operation surface of the input apparatus in order to move the pointer or cursor along the horizontal line or the vertical line, it is difficult in some cases for the user to slide the fingertip along the horizontal line or the vertical line. A conceivable reason for this is, for example, that the user may slide the fingertip while putting his or her wrist, elbow or the like on a structure body in a vehicle compartment. Thus, even in cases where the user is performing the operation with the intention to move the cursor or pointer along the horizontal line or the vertical line, the movement of the cursor or pointer on a display may not be consistent with the user's intention in some cases because it is difficult to perform the sliding operation along the horizontal line or the vertical line. As a result, the user may feel strangeness with the resultant display.

Since the input apparatus of Patent Document 1 only causes the detection characteristic of the input apparatus against the user's circle-like input operation to become close to a circular characteristic, it is impossible to eliminate the strange feeling when the cursor or pointer on the display is moved in the button image alignment direction.

SUMMARY

The present disclosure is made in view of the foregoing. It is an object of the present disclosure to provide an input apparatus that, without providing a strange feeling to a user, enables the user to exactly select his or her desired button image.

According to one example, an input apparatus for, in response to a user's sliding operation on an operation surface, inputting a coordinate point in the operation surface to move a pointing image, which is displayed on a display screen of a display device, to a target button image from among multiple button images comprises an acquisition device, a characteristic setting device, a correction device and an output device. The acquisition device acquires the coordinate point in the operation surface, which is inputted by the user's sliding operation on the operation surface. The characteristic setting device sets, as a characteristic line, a tendency of trace of the coordinate point in the user's sliding operation directed to a lateral direction or a longitudinal direction of the operation surface. The correction device corrects the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction. The output device outputs the coordinate point corrected by the correction device to the display device, as an output-coordinate for moving the pointing image.

According to the above input apparatus, when the user operates the input apparatus by performing the sliding operation in order to move the pointing image in the lateral direction or the longitudinal direction and inputs the trace of the coordinate point directed to the lateral direction or the longitudinal direction to the input apparatus, the correction device corrects the coordinate point so that the trace of the coordinate point is corrected to be the horizontal line or the vertical line. Then, the output device outputs the corrected coordinate point as the output-coordinate. Accordingly, even if the user's sliding operation in the lateral direction or the longitudinal direction is not movement along the horizontal line or the vertical line, the pointing image displayed on the display device has movement along the horizontal line or the vertical line. Therefore, the movement of the pointing image to an outside of the multiple button images, which have the target button image and are aligned in the lateral direction or the horizontal direction, is prevented, and as a result, the input apparatus enables the user to accurately select the target button image. Additionally, since the user intention to move the pointer image along the multiple button images, which have the target button image and are aligned in the lateral direction or the horizontal direction, substantially matches the movement of the pointing image on the display screen, the user strange feeling about the movement of the pointing image can be minimized.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
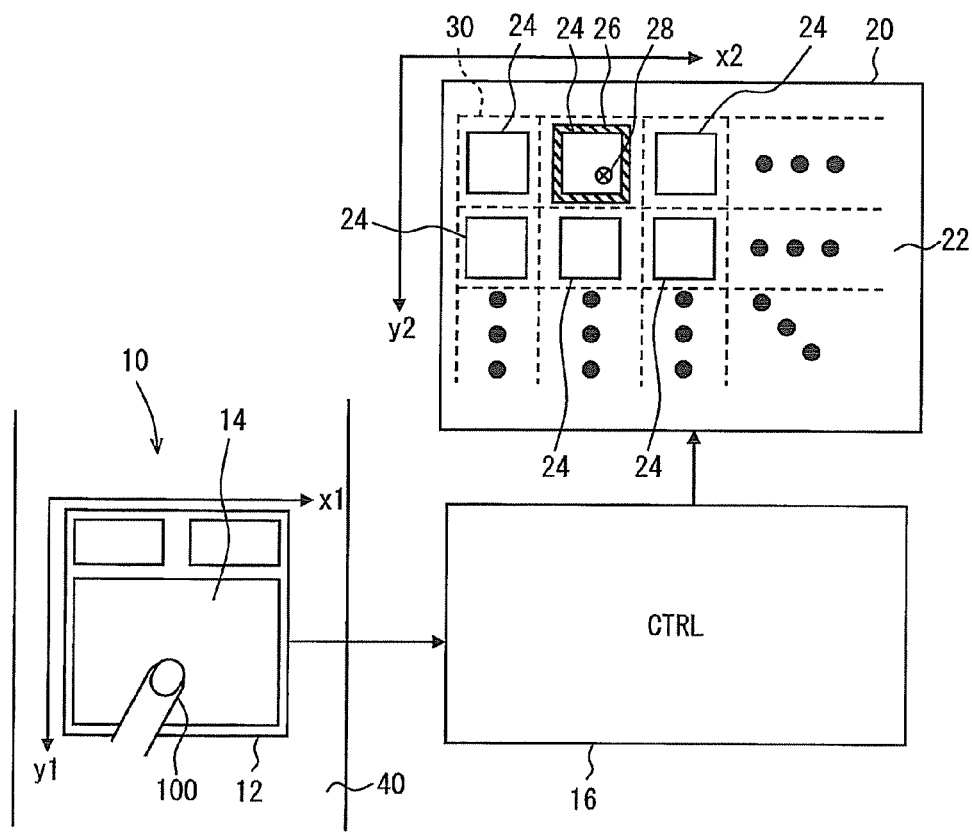
FIG. 1 is a block diagram illustrating an input apparatus according to a first embodiment.

Embodiments will be described with reference to accompanying drawings. Between the embodiments, like reference numerals are used to refer to like parts to omit redundant description.

First Embodiment

The input apparatus of the first embodiment will be described with reference to FIGS. 1 to 11. The input apparatus 10 is used for graphical user interface (GUI). The input apparatus 10 allows a user to move a cursor 26 (pointing image), which is displayed on a display screen 22 of a display 20 (display device), to a button image 24 on the display screen 22 and allows the user to select the button image 24. In the present embodiment, as shown in FIG. 1, multiple button images 24 are aligned along a horizontal line, which is a line parallel to a x1 axis, and multiple button images 24 are aligned along a vertical line, which is a line parallel to a y2 axis. The input apparatus 10 is electrically connected to various in-vehicle apparatuses mounted in a vehicle such as an air conditioner, a navigation apparatus, an audio apparatus and the like. The button images 24 on the display screen 22 are buttons for controlling various control units, and a corresponding in-vehicle apparatus is operated upon selection of a button image 24. When the user inputs a selection request to the input apparatus 10 in a situation where the button image 24 is pointed to by the cursor 26, the button image 24 is selected. In this way, the in-vehicle apparatus corresponding to the button image 24 is controlled.

The input apparatus 10 includes a touch pad 12 and a controller 16. The touch pad 12 is placed within reach of user's arm (e.g., driver) in a vehicle compartment. For example, the touch pad 12 is placed on a center console between a driver seat and a front passenger seat. To the touch pad 12, the user can input a request to move the cursor 26 and select the button image 24. The touch pad 12 includes, for example, an electrostatic sensor, a pressure sensitive sensor, and the like. The touch pad 12 includes an operation surface 14 on which a coordinate system is provided. The touch pad 12 outputs a signal to the controller 16 depending on a coordinate point in the coordinate system of the operation surface 14 and a pressure acting on the operation surface 14 when the user's finger touches the operation surface 14.

The controller 16 includes, as its main component, a microcomputer with a CPU, a ROM, a RAM, a backup RAM, a buffer 22 and the like. The controller 16 executes various control programs stored in the ROM, thereby performing a variety of processing. The controller 16 calculates a displacement vector from the coordinate points acquired from the touch pad 12 and controls movement of the cursor 26 on the display screen 22.

Now, the movement of the cursor 26 will be specifically described. First, a relation between the button image 24 and the cursor 26 will be described. The cursor 26 is an image that is displayed in a periphery of a frame of the button image 24 and provides a user with recognition that the button image 24 inside the cursor 26 is in a selectable state. That is, the cursor 26 is displayed in a periphery of a frame of one of the button images 24. A position of the cursor 26 is determined by a position of the pointer 28 in the display screen 22. The pointer 28 moves according to a change in coordinate point outputted form the touch pad 12. Attraction areas 30 are set to respective button images 24, so that when the pointer 28 enters a certain attraction areas 30, the cursor 26 moves to the periphery of the frame of the button image corresponding to the certain attraction areas 30. It should be noted that although the pointer 28 is depicted in FIG. 1 for illustration, the pointer 28 is not actually displayed on the display screen 22 and only a coordinate point of the pointer 28 is set. In FIG. 1, the attraction area 30 is an area inside a dashed line surrounding the periphery of the frame of the button image 24.

In the input apparatus 10 of the present embodiment, the pointer 28 moves relative to the touch pad 12. That is, a first touch position on the touch pad 12 corresponds to a position of the pointer at the present time, and the pointer 28 moves according to the movement of the finger 100 from the first touch position. Specifically, based on a change in coordinate point acquired from the touch pad 12, the controller 16 calculates the displacement vector of the fingertip sliding operation and moves the pointer 28 according to the calculated movement vector. In FIG. 1, the x1 direction is a lateral direction of the operation surface 14 of the touch pad 12, and the y1 direction is a longitudinal direction of the operation surface 14. In the present embodiment, this lateral direction is parallel to a width direction of the vehicle and the longitudinal direction is parallel to a vehicle front-to-back direction (see FIG. 1). In the present embodiment, a line parallel to the lateral direction (x1 direction) is referred to as a horizontal line. A line parallel to the longitudinal direction (y1 direction) is referred to as a vertical line. Additionally, the x2 direction of the display screen 22 of the display 20 is the lateral direction, and the y2 direction of the display screen 22 of the display 20 is the longitudinal direction. A horizontal line of the display screen 22 is a line parallel to the x2 direction, and a vertical line of the display screen 22 is a line parallel to the x2 direction.

Next, the movement of the pointer 28 by the controlled 16 and accompanied control of movement of the cursor 26 will be described in detail. In principle, the controller 16 moves the pointer 28 in response to the fingertip sliding operation on the operation surface 14 of the touch pad 12. However, in response to a predetermined user's sliding operating with the intention to move the cursor 26 in the lateral direction (x2 direction) or the longitudinal direction (y2 direction), the controller 16 corrects the movement of the pointer 28 so that the pointer 28 moves along the horizontal line or the vertical line.

Figure 2:
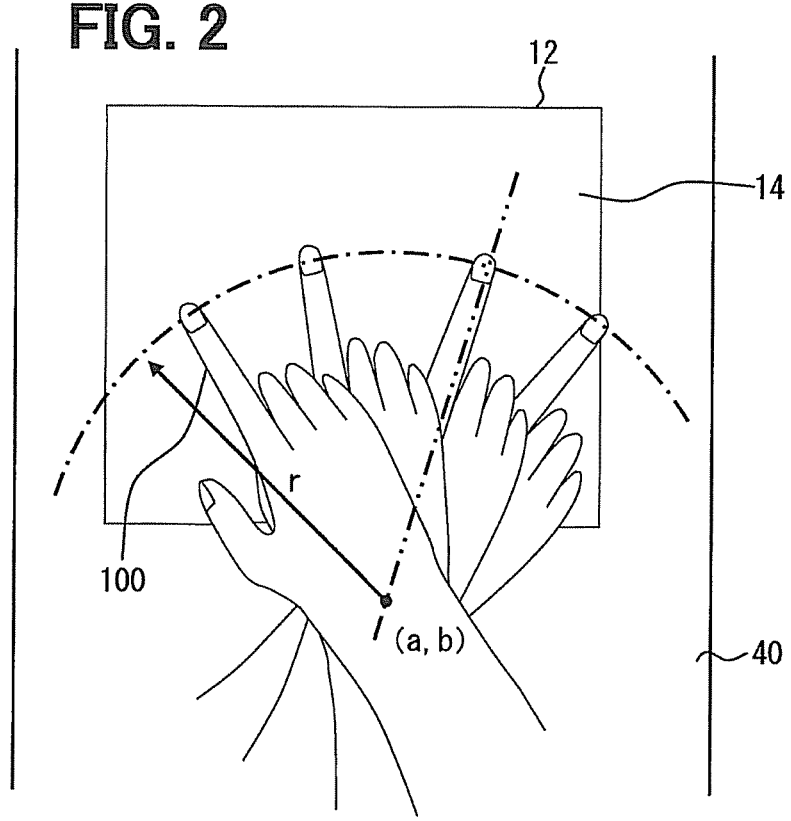
FIG. 2 is a diagram illustrating a user's sliding operation on an input apparatus in the first embodiment.

Now, a characteristic of the user's sliding operation when the cursor 26 is moved in the lateral direction or the longitudinal direction will be described. The inventors of the present application have found that there is a tendency of trace of a fingertip when a user performs an operation for moving the cursor 26 in the lateral direction or the longitudinal direction. This will be specifically described with reference to FIG. 2. An upper limb of the user shown in FIG. 2 is a right arm and a right wrist is fixed on the center console 40. In this situation, when the user moves the fingertip in the lateral direction in order to move the cursor 26 in the lateral direction, the fingertip moves along a circular arc (see the one-dot dashed line in FIG. 2) having a radius r and a center (a, b) at the right wrist. When the user who is fixedly putting the right wrist on the center console 40 moves the fingertip in the longitudinal direction in order to move the cursor 26 in the longitudinal direction, the fingertip moves along a straight line toward the center (a, b) of the circular arc (see the two-dots dashed line in FIG. 2).

Figure 3:
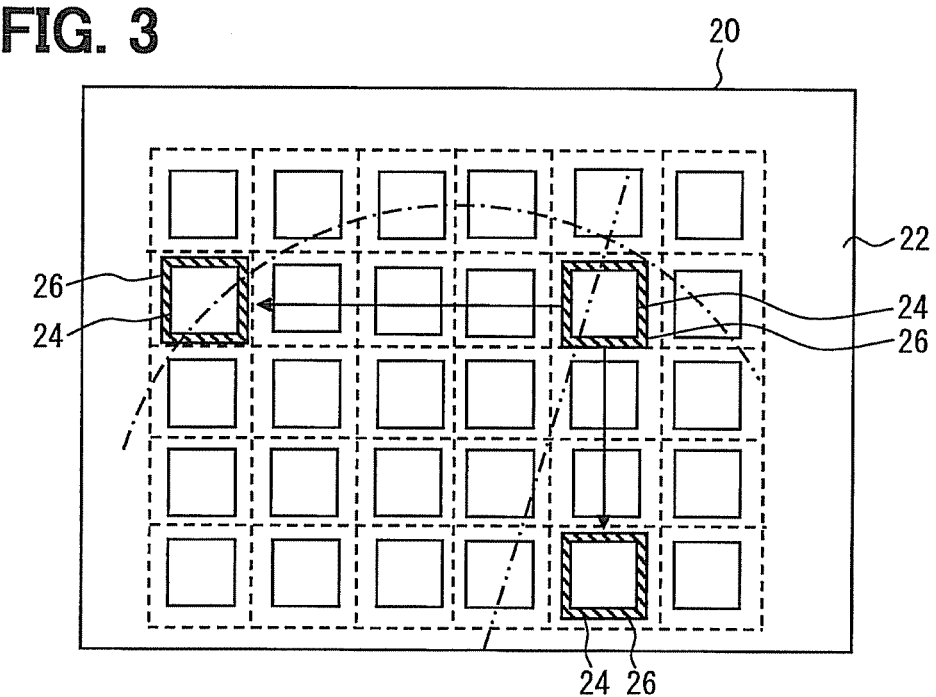
FIG. 3 is a diagram illustrating a button image, a cursor, and a pointer in the first embodiment.

Now, it is assumed that the pointer 28 is moved in accordance with the fingertip sliding operation on the operation surface 14 without correction to the movement of the pointer 28. In this case, as shown in FIG. 3, when the user intends to move the cursor 26 in the lateral direction, the pointer 28 moves along the circular arc (see the one-dot dashed line). As shown in FIG. 3, when this circular arc extends over the attraction areas 30 of two rows of button images 24 aligned one above the other, the cursor 26 moves not only into a row having a destination button image 24 but also into a row next to the row having the destination button image 24. Thus, although the user intends to move the cursor 26 in the lateral direction along the row having the destination button image 24, the cursor 26 does not move along the row having the destination button image 24, and as a result, the user may have a strange feeling.

Additionally, as shown in FIG. 3, when the user intents to move the cursor 26 in the longitudinal direction, the pointer 28 is moved along a straight line (see the two-dots dashed line) inclined with respect to the vertical line. As shown in FIG. 3, when this straight line extends over the attraction areas 30 of two columns of button images 24 aligned from side to side, the cursor 26 moves not only into a column having the destination button image 24 but also into a column next to the column having the destination button image 24. Thus, although the user intends to move the cursor 26 in the longitudinal direction along the column having the destination button image 24, the cursor 26 does not move along the column having the destination button image 24, and as a result, the user may have a strange feeling.

Next, the correction to the coordinate point of the pointer 28, which determines the displayed position of the cursor 26, will be described. First, explanation will be given on cases where the user moves the cursor 26 in the lateral direction.

At regular time intervals, the controller 16 acquires the coordinate point of the fingertip touching the operation surface 14 of the touch pad 12. Based on the coordinate point first acquired in the fingertip sliding operation, the controller 16 sets a circular arc (see the one-dot dashed line in FIG. 2) with reference to the first-acquired coordinate point as an estimation line and sets a belt-shaped estimation belt (see FIG. 5) containing the estimation line and having a predetermined width. This circular arc is the above-explained arc and is set based on the position of the right wrist of the user and the first contact position (first touch position) in the operation surface 14. The controller 16 determines whether or not the acquired coordinate point(s) is located along the estimation line (circular arc). This determination is made based on whether or not the acquired coordinate point(s) is within the estimation belt. By making this determination, it is possible to estimate whether or not the user intention is to move the cursor 26 along the horizontal line. When the controller 16 determines that the coordinate points are located along the estimation line, the controller 16 corrects the coordinate points of the pointer 28 on the display screen so that the trace of the coordinate points follows the horizontal line, and as a result, the cursor 26 moves along the horizontal line (see FIG. 3). Because of this, as long as the user slides his or her fingertip within the preset region (set as a circular-arc-shaped estimation belt), the pointer 28 is moved along the horizontal line. Additionally, when the user slides his or her fingertip with a diagonally-right-up circular-arc trajectory in order to move the cursor 26 to a right side from an upper end of the selection area, the cursor 26 is moved along the horizontal line if the user's fingertip moves along the predetermined circular arc (the preset estimation line). Through the above manners, the movement of the cursor 26 into an outside of the row of laterally-aligned button images having the destination button image 24 can be prevented, and the target button image 24 can be accurately selected. Additionally, since the user intention to move the cursor 26 along the row of laterally-aligned button images having the destination button image 24 matches the movement of the cursor 26 on the display screen 22, the user strange feeling about the movement of the cursor 26 can be eliminated.

In cases where the user moves the cursor 26 in the longitudinal direction, the controller 16 sets, based on the coordinate point first acquired from the touch pad 12 in the fingertip sliding operation, sets the circular arc with reference to the first-acquired coordinate point. Additionally, the controller 16 sets as the estimation line a straight line (see the two-dots dashed line in FIG. 2) extending toward the center of the circular act from the first-acquired coordinate point on the circular arc, and sets a belt-shaped estimation belt (see FIG. 5) containing the estimation line and having a predetermined width. Then the controller 16 determines whether or not the acquired coordinate point(s) are located along the set estimation line (straight line). This determination is made based on whether or not the acquired coordinate point(s) is within the estimation belt. By making this determination, it is possible to estimate whether the user intention is to move the move cursor 26 along the straight line. When the controller 16 determines that the coordinate points are located along the estimation line, the controller 16 corrects the coordinate points of the pointer 28 on the display screen 22 so that the trace of the coordinate points follows the vertical line. Accordingly, the cursor 26 moves along the vertical line (see FIG. 3). Through the above manners, movement of the cursor 26 into an outside of the column of longitudinally-aligned button images having the destination button image 24 can be prevented, and the target button image 24 can be accurately selected. Additionally, since the user intention to move the cursor 26 along the column of longitudinally-aligned button images having the destination button image 24 matches the movement of the cursor 26 on the display screen 22, the user strange feeling about the movement of the cursor 26 can be eliminated.

Next, a control flow which the controller 16 performs to correct the coordinate points of the pointer 28 will be described with reference to FIGS. 4 to 11. After an ACC of the vehicle is turned on, this control flow is repeatedly performed.

At S10, the controller 16 acquires the coordinate point from the touch pad 12. At S20, the controller 16 determines whether or not the acquired coordinate point is attributed to the first touch of the user after the start of this control flow. When the controller 16 determines that the coordinate point is attributed to the first touch, the process proceeds to S30. When the controller 16 determines that the coordinate point is not attributed to the first touch, the process proceeds to S60.

At S30, the controller 16 performs a setting process of setting the coordinate point of the pointer 28, which is set on the display screen 22 of the display device 20. Specifically, at S30, the coordinate point of the pointer 26 that is presently set on the display screen 22 of the display device 20 is set as an output-coordinate, which is to be outputted to the display device 20.

At S40, the controller 16 sets the estimation lines 50, 60 with reference to the coordinate point acquired from the touch pad 12 (see FIG. 5), where these estimation lines 50, 60 are the above-explained circular arc and straight line, respectively. In addition, the controller 16 sets the belt-shaped estimation belts 52, 62 for the estimation lines 50, 60, respectively. In the above, the estimation lines 50 is set to, for example, the circular arc whose center (a, b) is at the wrist of the user and whose radius r is from the center (a, b) to the position of the fingertip at which the fingertip contacts with the operating surface 14. The estimation line 60 is set to, for example, the straight line connecting between the center (a, b) of the circular arc and the position of the fingertip at which the fingertip contacts with the operating surface 14. More specifically, the circular arc and the straight line set as the estimation lines 50 and 60 may be lines each passing through the coordinate point that is first touched on the operation surface 14 and first acquired by the controller 16. After the estimation lines 50, 60 and the estimation belts 52, 62 are set at S40, the output-coordinate set at S30 is outputted to the display device 20 at S30. Through the above manners, on the display screen 22 of the display device, the pointer 28 is set at a position corresponding to the coordinate point set at S30. The cursor 26 is moved in accordance with the set position of the pointer 28.

After the user makes the fingertip contact with the operation surface 14, the user performs the fingertip sliding operation in the lateral direction or the longitudinal direction while keeping the fingertip in contact with the operation surface 14. In this case, the coordinate points corresponding to the movement of the fingertip are inputted to the touch pad 12, and outputted to the controller 16. In response to this, the controller 16 performs S10 again, and acquires new condensate points corresponding to the movement of the fingertip. Since these new coordinate points are not attributed to the first touch of the user, a result of the determination at S20 is negative, and the process proceeds to S60.

At S60, the controller 16 determines whether or not the sidling operation has been made along the estimation lines 50, 60 set at S40. This determination at S60 is made by comparing the newly-acquired coordinate points with the estimation belts 52, 62 and by determining whether or not the newly-acquired coordinate points are within the estimation belts 52, 62. When the newly-acquired coordinate points are within the estimation belts 52, 62, it is determined at S60 that the sliding operation has been performed along the estimation line 50, 60, and the process proceeds to S70. Specifically, when the newly-acquired coordinate points are within the estimation belt 52, 62, it can be estimated that the user intention is to move the cursor 26 along the horizontal line or the vertical line. When the newly-acquired coordinate points are not within the estimation belts 52, 62, it is determined that the sliding operation has not been along the estimation lines 50, 60.

At S70, the coordinate points of the pointer 28, which are to be outputted to the display device 20, are corrected so that the corrected trace of the pointer 28 follows the horizontal line or the vertical line. Thereafter, the corrected coordinate points are set as the output-coordinate of the pointer 28. At S50, the output-coordinate set at S50 is outputted to the display device 20. As a result, on the display screen 22 of the display device 20, the pointer 28 is set at positions corresponding to the coordinate points set at S50. Accordingly, the trace of the pointer 28 follows the horizontal line or the vertical line and the cursor 26 moves according to the trace.

At S80, without correcting the acquired coordinate points, the controller 16 sets the coordinate points of the pointer 28 on the display screen 22 as the output-coordinate in accordance with the displacement vector from the coordinate point inputted previous time to the coordinate point newly acquired this time.

At S90 after the S80 is performed, the controller 16 sets the estimation lines 50, 60 and the estimation belts 52, 62 with reference to the coordinate point newly-acquired this time. Since this setting of the estimation lines 50, 60 and the estimation belts 52, 62 at S90 is the same as the setting at S40, expiation on the setting at S90 is omitted here.

At S50 after S90 is performed, the output-coordinate set at S80 is outputted to the display device 20. As a result, on the display screen 22 of the display device 22, the pointer 28 is set at a position corresponding to the coordinate point set at S80. According to the set position of the pointer 28, the cursor 26 moves.

Figure 6:
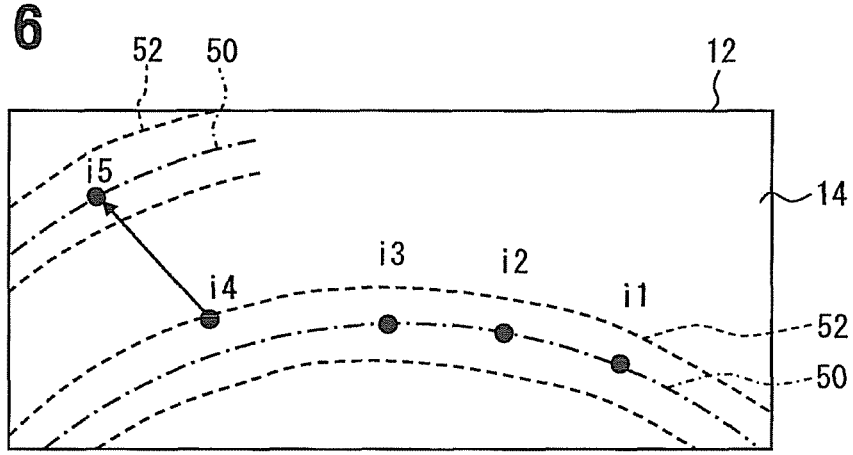
FIG. 6 is a diagram illustrating a trace of coordinate point inputted to a touch pad when a cursor is moved in a lateral direction in the first embodiment.
Figure 7:
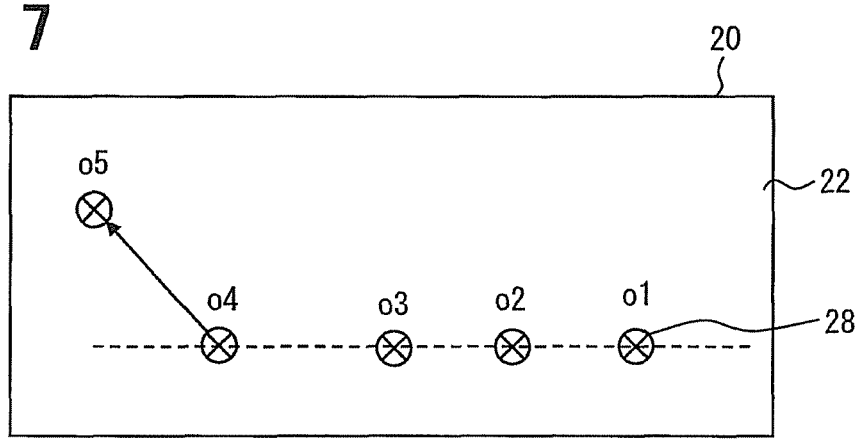
FIG. 7 is a diagram illustrating a trace of a pointer that is set on a screen of a display when a cursor is moved in a lateral direction in the first embodiment.
Figure 8:
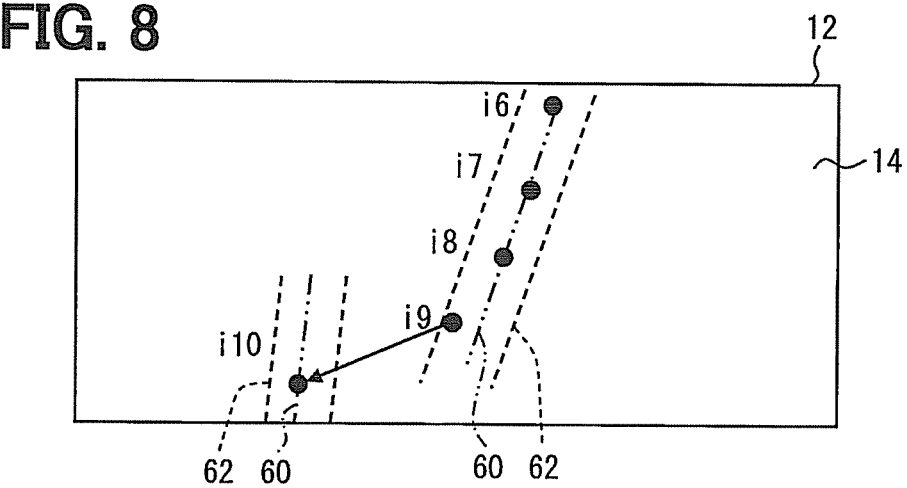
FIG. 8 is a diagram illustrating a trace of coordinate point inputted to a touch pad when a cursor is moved in a longitudinal direction in the first embodiment.
Figure 9:
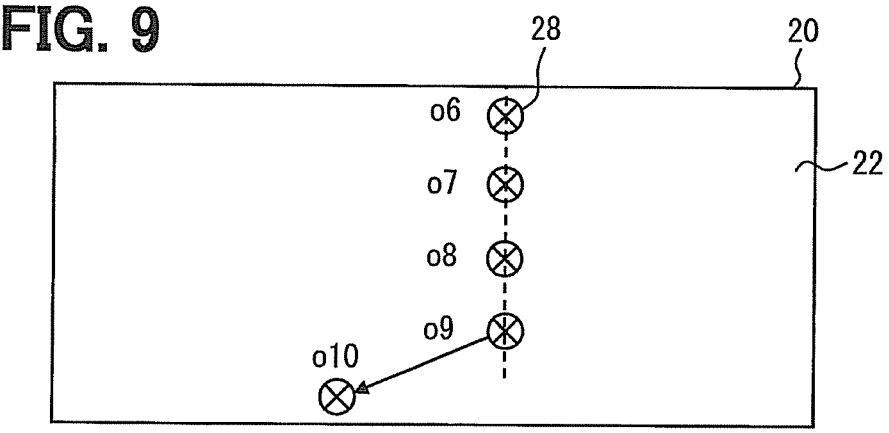
FIG. 9 is a diagram illustrating a trace of a pointer set on a screen of a display when a cursor is moved in a longitudinal direction in the first embodiment.

In the above, the control flow for correcting the coordinate point of the pointer 28 by the controller 16 has been described. Next, specific actions when the control flow is performed will be described with reference to FIGS. 6 to 9. Herein, as shown in FIGS. 6 and 8, i1 to i5 refer to the coordinate points repeatedly acquired by the controller 16. As shown in FIGS. 7 and 9, o1 to o5 refer to the positions corrected by the controller 16.

(In Cases of Movement of Cursor 26 in Lateral Direction)

FIG. 6 illustrates an input of coordinate points to the touch pad 12, and FIG. 7 illustrates the positions of the pointer 28 on the display screen 22. The numbers 1 to 6 of the respective coordinate points i1 to i6 in FIG. 6 indicate an order in which the controller 16 acquires the coordinate points. The numbers 1 to 6 of the pointers 28 o1 to o6 in FIG. 7 correspond to the numbers of the coordinate points inputted to the touch pad 12 and indicate an order in which the pointer 28 is set on the display screen 22.

As shown in FIG. 6, when the coordinate point i1 is acquired from the touch pad 12, the controller 16 sets the estimation line 50 and the estimation belt 52 with reference to the coordinate point i1. In this case, the coordinate point i1 corresponds to the position o1 of the pointer 28. Since the coordinate points i2, i3, which the controller 16 acquires after having acquired the coordinate point i1, are located on the estimation line 50, the output-coordinate to be outputted to the display device 20 is corrected so that the correction positions o2, o3 of the pointer 28 are located on the horizontal line (see the dashed line in FIG. 7) passing through the position o1. Specifically, in the above correction to the coordinate points, only y1 direction (longitudinal direction) coordinates of the coordinate points are corrected and x1 direction (lateral direction) coordinates of the coordinate points are not corrected. Moreover, since the coordinate point i4, which the controller 16 acquires after having acquired the coordinate point i3, is not located on the estimation line 50 but is within the estimation belt 52, the position o4 is corrected so that the corrected position o4 is located on the horizontal line. Moreover, the coordinate point i5, which is inputted to the controller 16 next, is out of the estimation belt 52. In this case, the position o5 is determined so as to correspond to the displacement vector from the coordinate point i4 to the coordinate point i5. Since the positions of the pointer 28 are corrected in the above way, the cursor 26 moves along the horizontal line.

In the above, since the coordinate point i5 is out of the estimation belt 52 that is set with reference to the coordinate point i1, the controller 16 sets the estimation line 50 and the estimation belt 52 with reference to the coordinate point i5 upon receipt of the coordinate point i5. Thereafter, the controller 16 repeatedly, makes such coordinate point correction as the correction to the coordinate points i1 to i5, until the finger of the user becomes spaced apart from the operation surface 14 and the controller 16 stops acquiring the coordinate points.

(In Cases of Movement of Cursor 26 in Longitudinal Direction)

FIG. 8 illustrates an input of coordinate points to the touch pad 12, and FIG. 9 illustrates the positions of the pointer 28 in the display screen 22. The numbers 6 to 10 of the respective coordinate points i6 to i10 in FIG. 8 indicate an order in which the controller 16 acquires the coordinate points. The numbers 6 to 6 of the pointers 28 o6 to o10 in FIG. 9 correspond to the numbers of the coordinate points inputted to the touch pad 12 and indicate an order in which the pointer 28 is set on the display screen 22.

As shown in FIG. 8, when the coordinate point i6 is acquired from the touch pad 12, the controller 16 sets the estimation line 50 and the estimation belt 52 with reference to the coordinate point i6. In this case, the coordinate point i6 corresponds to the position o6 of the pointer 28. Since the coordinate points i7, i8, which the controller 16 acquires after having acquired the coordinate point i6 are located on the estimation line 60, the output-coordinate to be outputted to the display device 20 are corrected so that the correction positions o7, o8 of the pointer 28 are located on the vertical line (see the dashed line in FIG. 9) passing through the position o6. Specifically, in the above correction to the coordinate points, only x1 direction (lateral direction) coordinates of the coordinate points are corrected and y1 direction (longitudinal direction) coordinates of the coordinate points are not corrected. Moreover, since the coordinate point i9, which the controller 16 acquires after having acquired the coordinate point i8, is not located on the estimation line 60 but is within the estimation belt 62, the position o9 is corrected so that the corrected position o9 is located on the vertical line. Moreover, the coordinate point i10, which the controller 16 acquires after having acquired the coordinate point i9, is out of the estimation belt 62. In this case, the position o10 is determined so as to correspond to the displacement vector from the coordinate point i9 to the coordinate point i10. Since the positions of the pointer 28 are corrected in the above way, the cursor 26 moves along the vertical line.

In the above, since the coordinate point i10 is out of the estimation belt 62 that is based on the coordinate point i6, the controller 16 sets the estimation line 60 and the estimation belt 62 with reference to the coordinate point i10 upon acquisition of the coordinate point i10. Thereafter, the controller 16 repeatedly makes such coordinate point correction as the correction to the coordinate points i6 to i10, until the finger of the user becomes spaced apart from the operation surface 14 and the controller 16 stops acquiring the coordinate points.

If a certain acquired coordinate point is located out of both of the estimation belts 52 and 62 when the cursor 26 is moved in the lateral direction or the longitudinal direction, the estimation belts 52, 62 are again set with reference to the certain coordinate point. Therefore, the movement of the cursor 26 from the certain coordinate point can be estimated.

Figure 10:
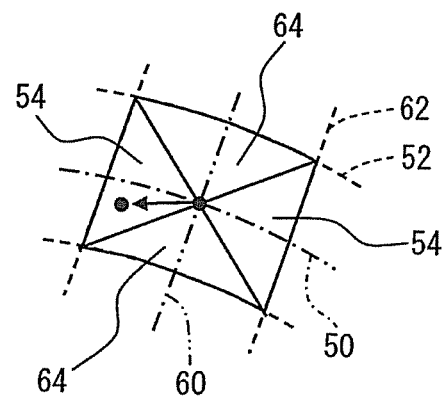
FIG. 10 is a diagram illustrating an overlap region of two estimation belts in the first embodiment.

As described above, at S40 and S90, with reference to the coordinate point acquired first from the touch pad 12, the controller 16 simultaneously sets the estimation line 50 for the lateral direction, the estimation line 60 for the longitudinal direction, the estimation belt 52 for the lateral direction, and the estimation belt 62 for the longitudinal direction. When the estimation lines 50, 60 and the estimation belts 52, 62 are set in the above way, the coordinate point acquired next may be within an overlapping region where the estimation belts 52, 62 overlap with each other. In this case, since the coordinate point is within both of the estimation belts 52 and 62, it becomes difficult to estimate in which direction the user intends to move the cursor 26. Measures against this case will be described As shown in FIG. 10, the overlapping region of the estimation belt for lateral direction movement and the estimation belt for longitudinal direction movement is provided with areas 54 for the lateral direction movement and areas 64 for longitudinal direction movement. Four partition lines radially extend from an intersection point (point of intersection) between the estimation line 50 and the estimation line 60 to four corners of the overlapping region, respectively. The four partition lines divide the overlapping region into the four areas such that: two of the four areas located on opposite sides of the estimation line 60 are the areas 54 for the lateral direction movement; and the other two of the four area located on opposite sides of the estimation line 50 are the areas 64 for the longitudinal direction movement. When the coordinate point acquired next is within the areas 54, the process proceeds to S70 to correct the output-coordinate, which is to be outputted to the display device 20, in accordance with the estimation belt 52. When the coordinate point acquired next is within the areas 64, the process proceeds to S70 to correct the output-coordinate, which is to be outputted to the display device 20, in accordance with the estimation belt 62. According to the above manners, even when the coordinate point acquired next is within the overlapping region where the two estimation belts overlap with each other, it is possible to estimate the user-intended operation direction, and it is possible to appropriately correct the coordinate point.

Figure 11:
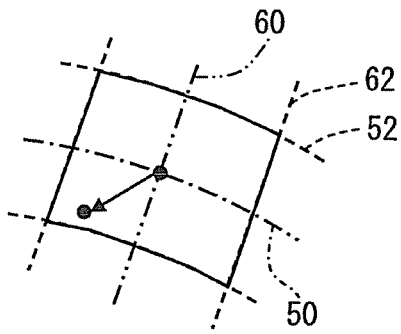
FIG. 11 is a diagram illustrating processing in cases where a newly-acquired coordinate point after estimation belts are set is within an overlap region of the two estimation belts in the first embodiment.

Alternatively, as shown in FIG. 11, when the next-acquired coordinate point is within the overlapping region of the estimation belts 52 and 62, the correction to the next-acquired coordinate point may be prohibited, and the coordinate paint corresponding to the displacement vector from the first-acquired coordinate point may be outputted to the display device 20. Specifically, when the next-acquired coordinate point is within the overlapping region of the two estimation belts 52 and 62, the determination at S60 may result in NO and the process may proceed to S80. Accordingly, on the image of the display device 20, the pointer 28 may be slightly moved in accordance with the displacement vector that is set from the pointer 28 corresponding to the first-acquired coordinate point. In the above configuration, when the coordinate point is within the overlapping region of the estimation belts 52 and 62, the correction to the coordinate point is not made regardless of the presence of the coordinate point within the region for correction, by assuming that the user intention of the movement direction of the cursor is unknown. Therefore, an ill-planed correction to the coordinate points under a situation where the user intention of the movement direction of the cursor 26 is unknown can be prevented.

In the present embodiment, the controller 16 performing S10 can correspond to an example of acquisition means and device. The controller 16 performing S60, S70 can correspond to an example of correction means and device. The controller 16 performing S50 can correspond to an example of output means and device. The estimation lines 50 and 60 can correspond to an example of characteristic line for a lateral direction and an example of characteristic line for a longitudinal direction, respectively. The estimation belts 52 and 62 can correspond to an example of characteristic belt for a lateral direction and an example of characteristic belt for a longitudinal direction, respectively. The controller 16 performing S40 and S90 can correspond to an example of characteristic setting means and device. The controller 16 performing S70 can correspond to an example of change means and device. The areas 54 can correspond to an example of first change areas. The areas 64 can correspond to an example of second change areas. The controller 16 performing S60, which is illustrated with reference to FIG. 11, can correspond to an example of prohibition means and device.

Second Embodiment

In the first embodiment, the setting of the estimation lines 50, 60 and the estimation belts 52, 62 is based on the trace of fingertip when the user slides his or her fingertip on the operation surface 14 in the lateral direction or the longitudinal direction while fixing his or her wrist at a predetermined position. In the second embodiment, the estimation lines 50, 60 and the estimation belts 52, 62 are set depending on a state of the upper limb of the user.

Figure 4:
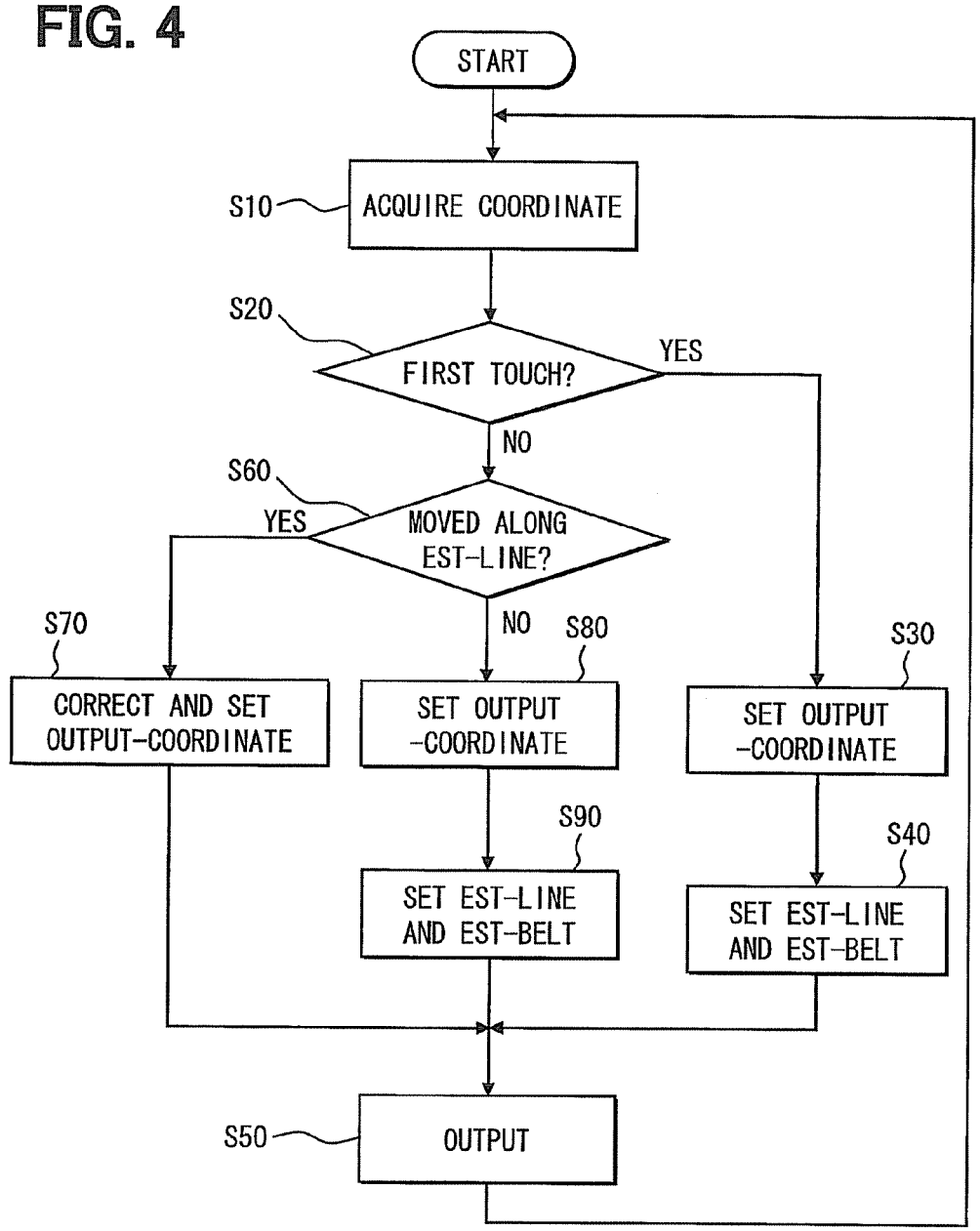
FIG. 4 is a flowchart illustrating a control flow for correcting an acquired coordinate point in the first embodiment.
Figure 5:
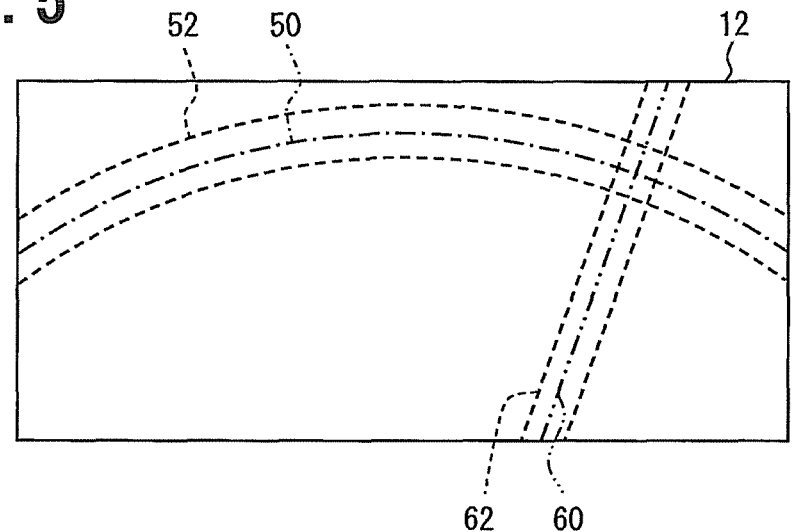
FIG. 5 is a diagram illustrating an estimation line and an estimation belt which are set by a controller in the first embodiment.
Figure 12:
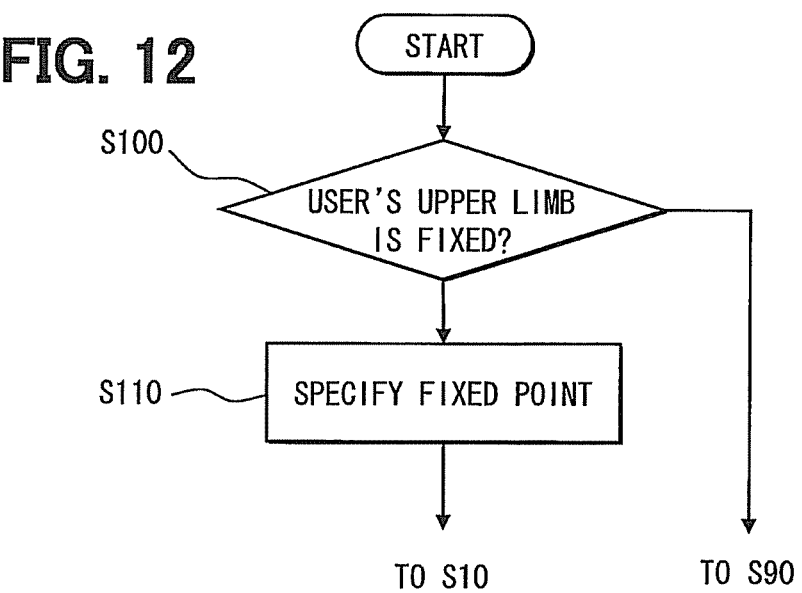
FIG. 12 is a flowchart illustrating a control flow for correcting an acquired coordinate point in a second embodiment.

Specifically, a control flow illustrated in FIG. 12 is performed prior to S20 in FIG. 4. At S100, the controller 16 determines whether or not a part of the upper limb of the user other than the fingertip is fixed somewhere in the center console 40. When it is determined that the part of the upper limb of the user other than the fingertip is fixed somewhere in the center console 40, the process proceeds to S110. At S110, the controller 16 specifies a fixed point where the upper limb is fixed to the center console 40. This fixed point is used at S40 and S90 as a parameter in setting the estimation lines 50, 60 and the estimation belts 52, 62. At S40 and S90, a circular arc with its center at this fixed point and a straight line passing through the fixed point are set.

The fixed point of the upper limb is detected by, for example, in the following way. A pressure sensor is provided on a surface of the center console 40 and a pressure state of the surface of the center console 40 detected with the pressure sensor is used to detect the fixed point of the upper limb. Alternatively, an imaging device such as a camera or the like may be provided at a ceiling of the vehicle compartment and a photographed image of the vehicle compartment may be used to detect the fixed point of the upper limb.

By setting the estimation lines 50, 60 and the estimation belts 52, 62 depending on the state of the upper limb (position of the fixed point) and by correcting the output-coordinate using the estimation lines 50, 60 and the estimation belts 52, 62, it is possible to move the cursor 26 along the horizontal line or the vertical line even if the tendency of user's sliding operation is changed due to a change in the fixed point of the upper limb.

When the determination at S100 results in NO, the controller 16 outputs the acquired coordinate point as the output-coordinate to the display device 20 without correcting the acquired coordinate point. The inventors of the present application have found that in cases where the part of the upper limb other than the finger is not fixed to the center console 40, the trace of fingertip on the operation surface 14 is not a specified line (circular arc, straight line) in many cases. Thus, in cases where the part of the upper limb other than the finger is not fixed to the center console 40, the controller 16 outputs the acquired coordinate point as the output-coordinate to the display device 20 without correcting the acquired coordinate point. Because of this, an ill-planed correction to the coordinate point with the estimation lines 50, 60 and the estimation belts 52, 62 and a resultant movement of the cursor 26 to a user-unintended position can be prevented.

In the present embodiment, the controller 16 performing S100 and S110 can correspond to an example of state detection means and device. The center console 40 can correspond to an example of structure body.

Third Embodiment

In the first embodiment, the circular arc passing through the coordinate point acquired from the touch pad 12 is set so that the circular arc has its center at a coordinate point that is predetermined as a reference point. In the third embodiment, based on the sliding operation for canceling a locked state of the display screen 22 of the display device 20, the circular arc is calculated and this circular arc is set as the estimation line 50, 60. This procedure will be specifically described below.

Figure 13:
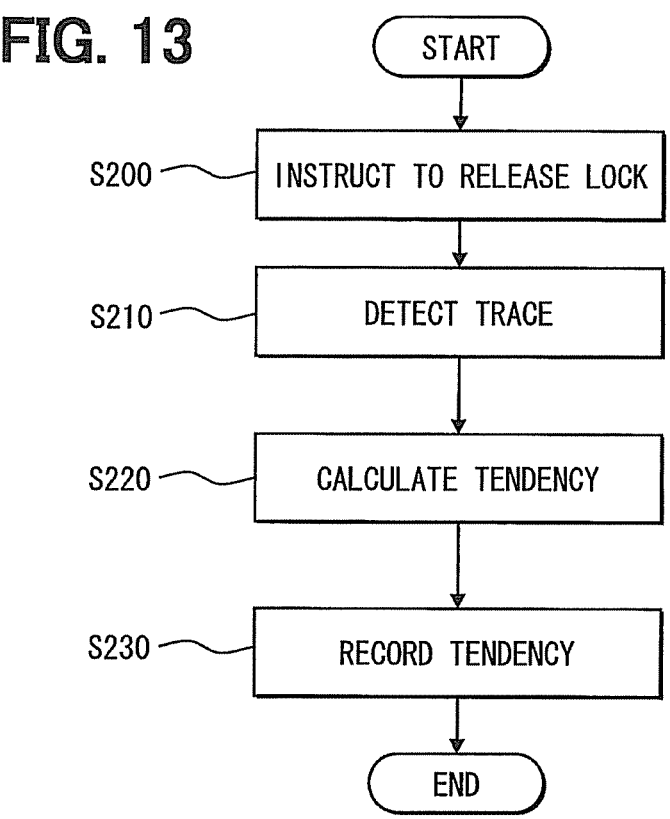
FIG. 13 is a flowchart for determining a parameter for setting an estimation line or an estimation belt.
Figure 14:
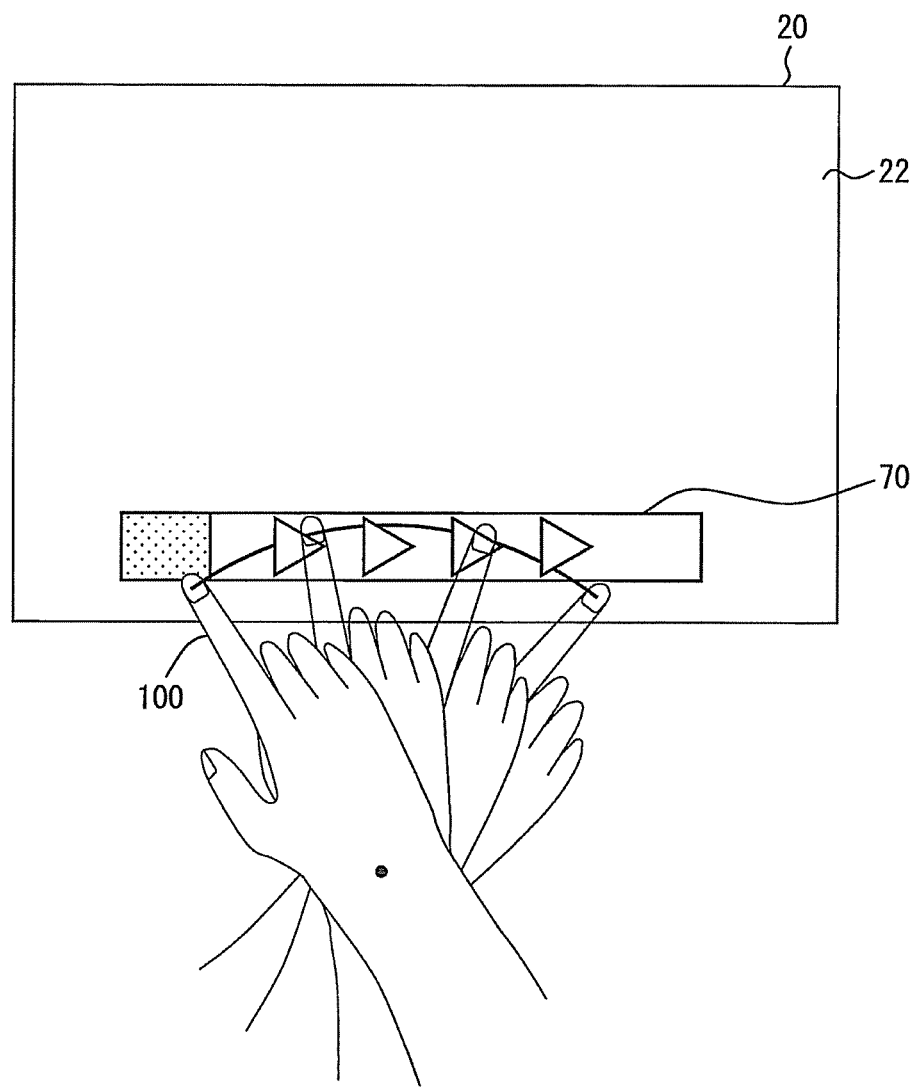
FIG. 14 is a diagram for explaining release of lock of a display in a third embodiment.

A control flow illustrated in FIG. 13 is performed before the control flow illustrated in FIG. 4 is performed. At S200, the controller 16 instructs the user to cancel the lock of the display screen 22 of the display device 20. Specifically, the user can release the lock by performing the sliding operation along an operation instruction image 70 extending along the horizontal direction on the display screen 22. At S210, the controller 16 detects the trace of the finger 100 of the user at a time when the user cancel the lock the display screen 22 of the display device 20. The trace of the fingertip 100 is detectable from the trace of the coordinate points acquired from the touch pad 12. At S220, the controller 16 calculates an approximated circle from the detected trace and thereby calculates a tendency of trace of coordinate points when the fingertip slides in the lateral direction. The tendency of trace of coordinate points may be represented by a center of the approximated circle, a curvature of the approximated circle or the like. This tendency is used as a setting factor (also called a setting parameter) for setting the estimation lines 50, 60. At S230, the controller 16 stores the setting factor calculated at S220. The stored setting factor is used at S40 and S90 in FIG. 5 to set the estimation lines 50, 60. At S40 or S90, the controller 16 sets the estimation line 50 by, for example, setting the circular arc which has its center at the center of the approximated circle and which passes through the position of the finger at which the touch pad is touched. Additionally, the line connecting the center of the approximated circle and the position of the finger at which the touch pad is touched is set as the estimation line 60. According to this, since the estimation lines 50, 60 are based on the actual user sliding operation, it is possible to improve accuracy of the estimation lines 50, 60 and it is possible to enable the cursor 26 to move along the horizontal line or the vertical line.

In one illustration of the present embodiment, the user's sliding operation in the lateral direction releases the lock. However, the user's sliding operation in the longitudinal direction may release the lock.

In the present embodiment, the controller 16 performing S200 can correspond to an example of operation instruction means and device. The controller 16 performing S220 can correspond to an example of calculation means and device. The controller 16 performing S230 can correspond to a storing means and device.

Fourth Embodiment

In the first, second and third embodiments, by correcting the acquired coordinate points based on the estimation lines 50, 60 and the estimation belts 52, 62, the controller 16 makes the pointer 28 move along the horizontal line or the vertical line on the display screen 22. In the fourth embodiment, the estimation lines 50, 60 and the estimation belts 52, 62 like those in the foregoing embodiments are not set. Instead, coordinate transformation is performed on the acquired coordinate points, and a result of the coordinate transformation is outputted to the display device 20.

In the followings, two cases, one of which is movement of the cursor 26 in the lateral direction and the other of which is movement of the cursor 26 in the longitudinal direction will be described.

(In Cases of Movement of Cursor 26 in Lateral Direction)

Figure 15:
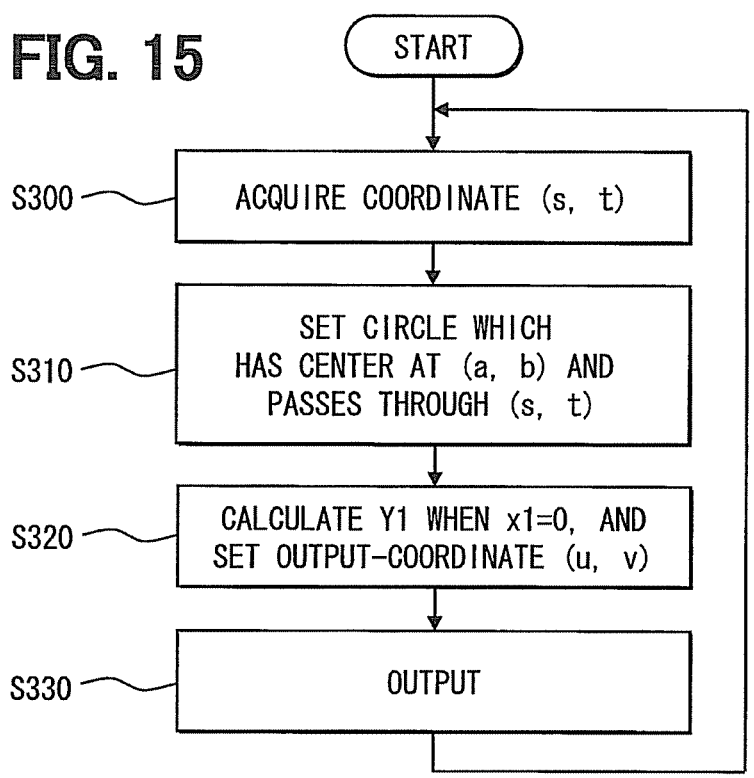
FIG. 15 is a flowchart which is applied to movement of a cursor in a lateral direction and which illustrates a control flow for coordinate transformation on an acquired coordinate point in a fourth embodiment.
Figure 16:
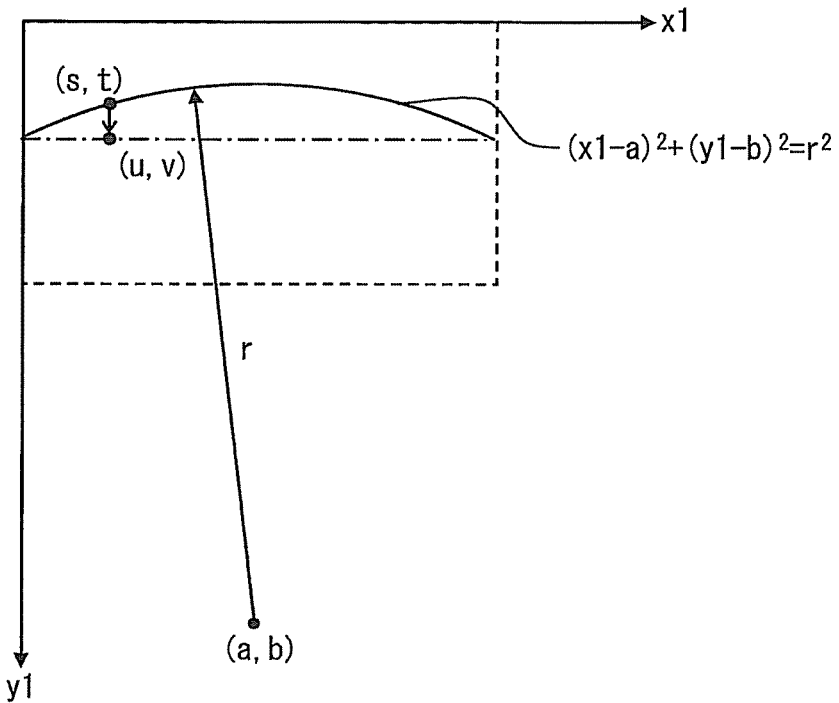
FIG. 16 is a diagram for explaining a situation of coordinate transformation when the control flow illustrated in FIG. 14 is executed.

A control flow illustrated in FIG. 15 is started when the coordinate point (s, t) in the coordinate system (see FIG. 1) of the touch pad 12 is inputted by the user. At S300, the controller 16 acquires the coordinate point (s, t). At S310, the controller 16 sets a circular $((x1-a)^2+(y1-b)^2=r^2)$ which has a center at a predetermined coordinate point (a, b) and which passes through the coordinate point (s, t), as shown in FIG. 16. This circle, which has the center at the predetermined coordinate point (a, b), represents a trace of fingertip of the user when the user moves the fingertip in the lateral direction (x1 direction) in order to move the cursor 26 in the lateral direction. For example, the coordinate point (a, b) may be a point where the wrist of the user is fixed to the center console 40. It should be noted that in FIG. 16, a region defined by the dashed line shows the operation surface 14.

At S320, the controller 16 calculates y1 of the above expression of the circle when x1=0. The y1 can be calculated from the following expression:

$$y1=b+\sqrt{(s-a)^2+(t-b)^2-a^2}. \quad \text{(expression 1)}$$

The obtained value of y1 is set as v of the output-coordinate (u, v). Further, x1 of the acquired coordinate point s is set to u of the output-coordinate (u, v).

At S330, the output-coordinate (u, v) set at S320 is outputted to the display device 20. Accordingly, on the display screen 22 of the display device 20, the pointer 28 is set at a position corresponding to the output-coordinate (u, v). According to the above procedure of coordinate transformation, when the coordinate point (s, t) inputted to the touch pad 12 moves on the circular arc as illustrated in FIG. 16 for example, the trace of the output-coordinate (u, v) is parallel to x1 (see the one-dot dashed line). In the above, the trace of the pointer 28 on the display screen 22 is parallel to x2, and the cursor 26 moves along the horizontal line (see FIG. 1).

(In Cases of Movement of Cursor 26 in Longitudinal Direction)

Figure 17:
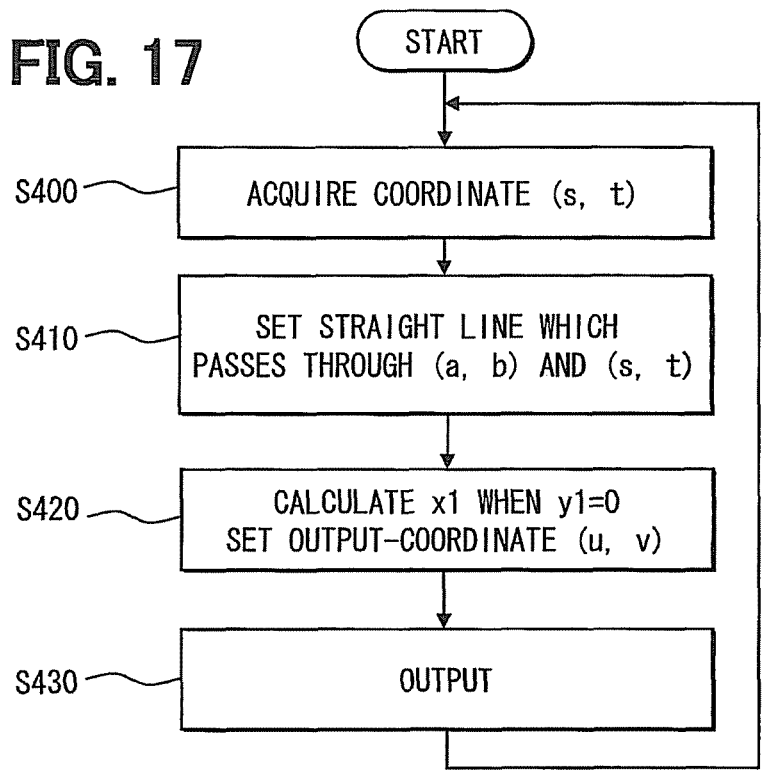
FIG. 17 is a flowchart which is applied to movement of a cursor in a longitudinal direction and which illustrates a control flow for coordinate transformation on an acquired coordinate point in the fourth embodiment.
Figure 18:
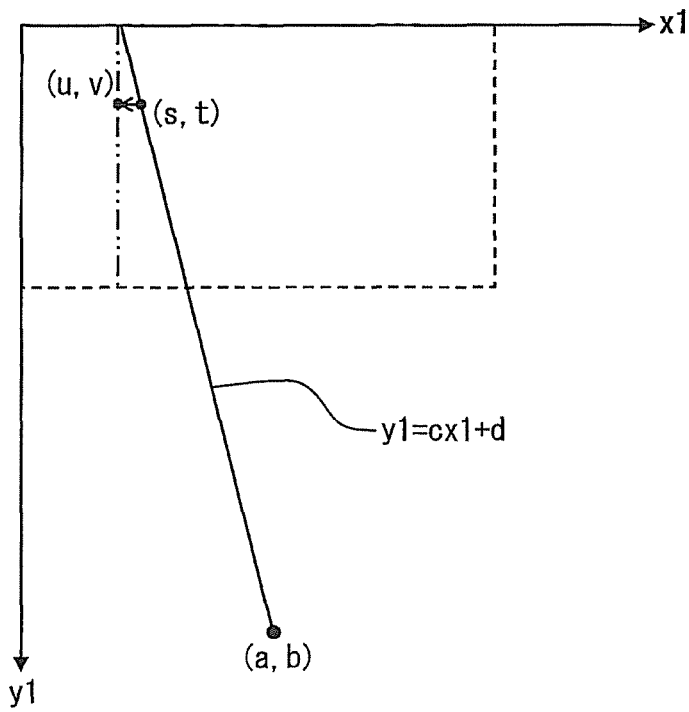
FIG. 18 is a diagram for explaining a situation of coordinate transformation when the control flow illustrated in FIG. 17 is executed.

A control flow illustrated in FIG. 17 is started when the coordinate point (s, t) in the coordinate system (see FIG. 1) of the touch pad 12 is inputted by the user. At S400, the controller 16 acquires the coordinate point (s, t). At S410, the controller 16 sets a straight line (y1=cx1+d) which passes through a predetermined coordinate point (a, b) and the acquired coordinate point (s, t), as shown in FIG. 18. This straight line, which travels from the coordinate point (s, t) toward the predetermined coordinate point (a, b), represents a trace of fingertip of the user when the user moves the fingertip in the longitudinal direction (y1 direction) in order to move the cursor 26 in the longitudinal direction. For example, the coordinate point (a, b) may be a point where the wrist of the user is fixed to the center console 40. It should be noted that in FIG. 18, a region defined by the dashed line represents the operation surface 14.

At S420, since the straight line passes through the coordinate point (s, t) and the coordinate point (a, b), the controller 16 calculates "c" based on the below-described expression (2) and "d" based on the below-described expression (3), and further calculates "x1" in the case of "y1=0" from the below-described expression (4). The obtained x1 is set to u of the output-coordinate (u, v). Further, t of the acquired coordinate point is set to v of the output-coordinate (u, v).

$$c = \frac{t-b}{s-a} \quad \text{(expression 2)}$$

$$d = t - s\frac{t-b}{s-a} \quad \text{(expression 3)}$$

$$x1 = s - \frac{t(s-a)}{t-b} \quad \text{(expression 4)}$$

At S430, the output-coordinate (u, v) set at S420 is outputted to the display device 20. Accordingly, on the display screen 22 of the display device 20, the pointer 28 is set at a position corresponding to the output-coordinate (u, v). According to the above procedure of coordinate transformation, when the coordinate point (s, t) inputted to the touch pad 12 moves on the straight line as illustrated in FIG. 18 for example, the trace of the output-coordinate (u, v) becomes parallel to y1 (see the two-dot dashed line). In the above, the trace of the pointer 28 on the display screen 22 becomes parallel to y2, and the cursor 26 moves along the vertical line (see FIG. 1).

As described above, the output-coordinate is automatically transformed with the predetermined equation (e.g., circle, straight line). Thus, each time the controller 16 acquires the coordinate point, it is unnecessary to determine whether or not the acquired coordinate point is located along the estimation line. Therefore, with a simple configuration, it is possible to make the trace of the pointer 28 along the horizontal line or the vertical line.

In the present embodiment, the controller 16 performing the S310, S410 can correspond to an example of characteristic setting means and device. The controller 16 performing S320, S420 can correspond to an example of coordinate transform means and device.

Fifth Embodiment

In the fourth embodiment, the predetermined equations are individually set for respective movements of the cursor 26 in the lateral direction and the longitudinal direction, and the acquired coordinate point is automatically transformed with the predetermined equations. In the fifth embodiment, the respective coordinate transformations of the fourth embodiment are combined.

Figure 19:
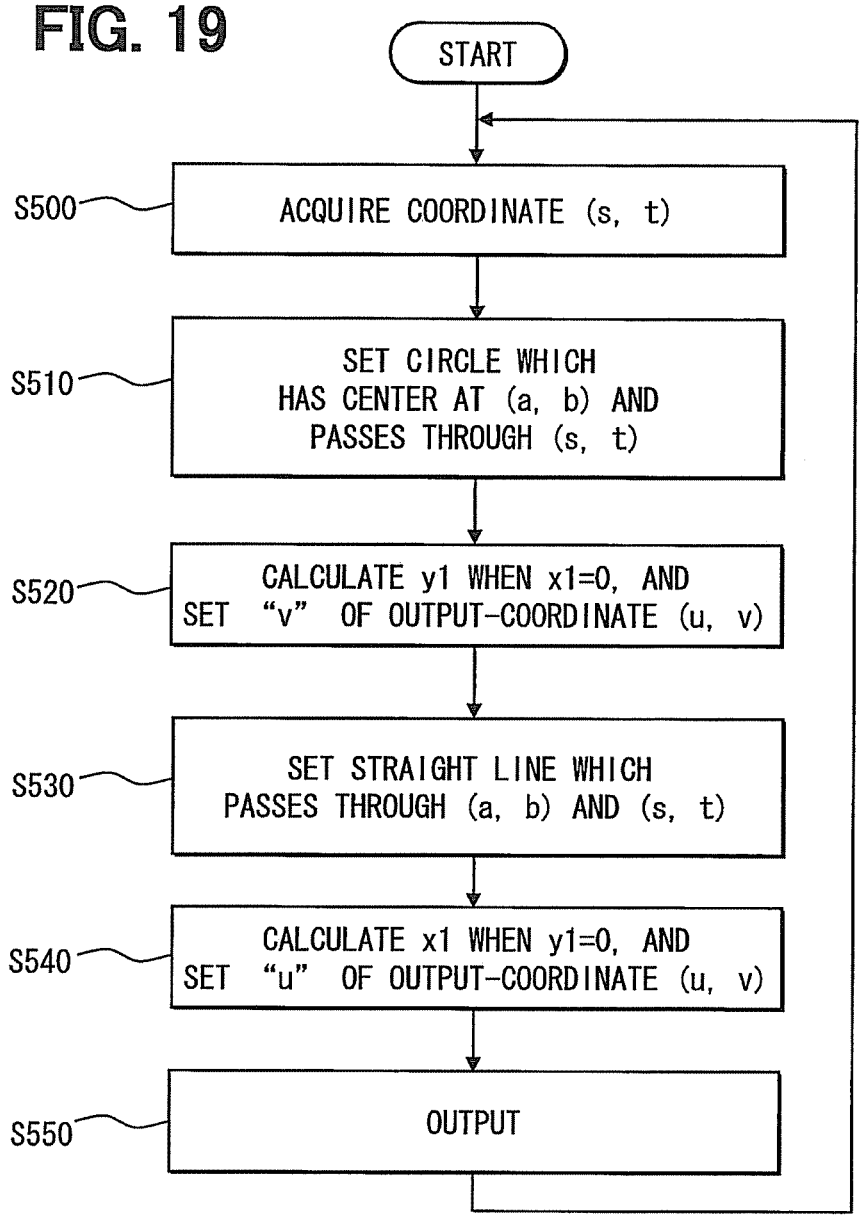
FIG. 19 is a flowchart which is applied to movement of a cursor in a lateral direction or a longitudinal direction, and which illustrates a control flow for coordinate transformation on an acquired coordinate point in a fifth embodiment.
Figure 20:
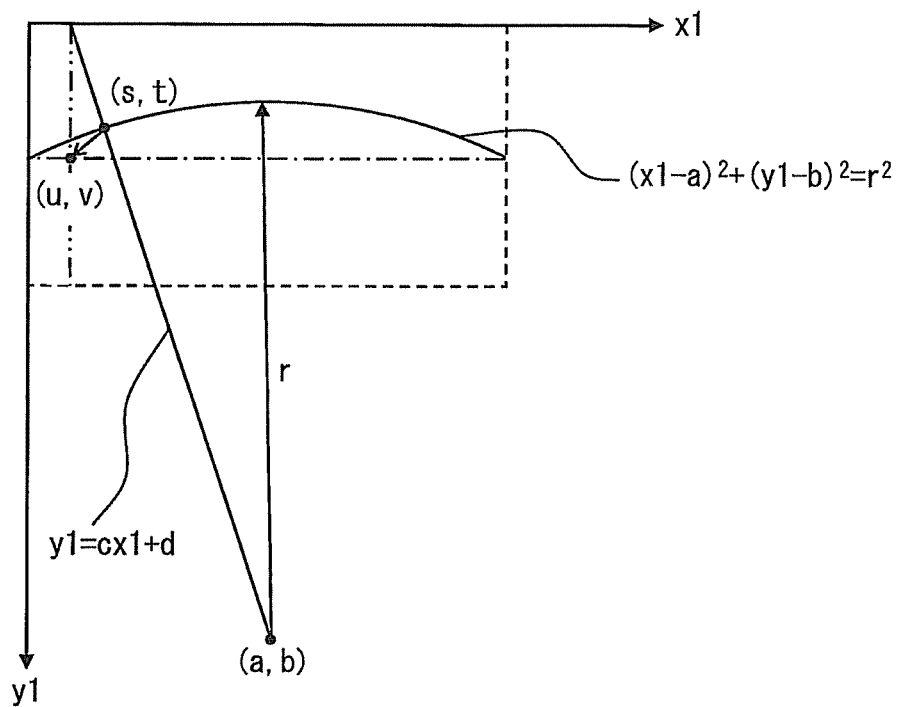
FIG. 20 is a diagram for explaining a situation of coordinate transformation when the control flow illustrated in FIG. 19 is executed in the fifth embodiment.

A control flow illustrated in FIG. 19 is started when the coordinate point (s, t) in the coordinate system (see FIG. 1) of the touch pad 12 is inputted to the touch pad 12 by the user. At 5500, the controller 16 acquires the coordinate point (s, t). At S510, the controller 16 sets a circle $((x1-a)^2+(y1-b)^2=r^2)$ which has a center at a predetermined coordinate point (a, b) and which passes through a coordinate point (s, t), as shown in FIG. 20. Since this circle can be substantially the same as the circle illustrated in FIG. 16, the explanation on this circle is omitted here. In FIG. 20, a region defined by the dashed line represents the operation surface 14. At S520, the controller 16 calculates y1 when x1=0 in the above expression of the circle. It should be noted that the above described expression (1) can be used to calculate y1. Then, the obtained y1 is set as v of the output-coordinate (u, v).

At S530, the controller sets a straight line (y1=cx1+d) which passes through the predetermined coordinate point (a, b) and the acquired coordinate point (s, t), as shown in FIG. 20. Since this straight line can be substantially the same as the straight line illustrated in FIG. 18, the explanation on this straight line is omitted here.

At S540, the controller 16 calculates x1 when y1=0 in the above equation of the straight line. The expression (4) can be used to calculate x1. Then, the obtained x1 is set as u of the output-coordinate (u, v).

At S550, the output-coordinate (u, v) set at S520 and S540 is outputted to the display device 20. Accordingly, on the display screen 22 of the display device 20, the pointer 28 is set at a position corresponding to the output-coordinate (u, v). According to the above procedure of coordinate transformation, when the coordinate point (s, t) inputted to the touch pad 12 moves on the circular arc as illustrated in FIG. 20 for example, the trace of the output-coordinate (u, v) becomes parallel to x1 (see the one-dot dashed line). In the above, the trace of the pointer 28 on the display screen 22 becomes parallel to x2, and the cursor 26 moves along the horizontal line. When the coordinate point (s, t) moves on the straight line as illustrated in FIG. 20, the trace of the output-coordinate (u, v) becomes parallel to y1 (see the two-dot dashed line). In the above, the trace of the pointer 28 on the display screen 22 becomes parallel to y2, and the cursor 26 moves along the vertical line.

Other Embodiments

Embodiments are not limited to the first to fifth embodiments. Other embodiments will be illustrated.

In the first to fifth embodiments, the pointer 28 is not displayed on the display screen 28. However, the pointer 28 may be displayed on the display screen 28. For example, an arrow image may be displayed as the pointer 28 on the display screen 22.

In the first to third embodiments, the pointer 28 on the display screen 22 is moved in a relative manner in response to the user finger operation on the operation surface 14 of the touch pad 12. However, the coordinates on the operation surface 14 may correspond to the coordinates on the display screen 22. In this configuration, when the fingertip moves from the coordinate point i4 to the coordinate point i5 as shown in FIG. 6, the position of the pointer 28 set on the display screen 22 is the position corresponding to the coordinate point i5 on the operation surface 14. Additionally, when the fingertip moves from the coordinate point i9 to the coordinate point i10 as shown in FIG. 8, the position of the pointer 28 set on the display screen 22 is the position corresponding to the coordinate point i10 on the operation surface 14.

In the second embodiment, when the part of the upper limb of the user is not fixed to the center console 40, the correction to the output-coordinate using the estimation lines 50, 60 and the estimation belts 52, 62 is prohibited. This configuration of the second embodiment may be applied to the fourth embodiment and the fifth embodiment. Specifically, when the part of the upper limb of the user is not fixed to the center console 40, the controller 16 may not set the circular arc and the straight line at S310 (fourth embodiment), S410 (fourth embodiment), S510 (fifth embodiment) and S530 (fifth embodiment), and the controller 16 may output the acquired coordinate point to the display device 20 as the output-coordinate without correcting the acquired coordinate point.

Upper limbs of users at a time when the users operate the operation surface 14 may have substantially the same form. Specifically, of the coordinate point (a, b) at which the part of the upper limb is fixed to the center console 40, "a" component (i.e., the position in the lateral direction) may be substantially the same. Additionally, since the part of the upper limb to be fixed to the center console 40 is substantially the same, the distance from the part to the fingertip does not vary substantially. That is, of the coordinate point (a, b), only "b" component is changed according to the position of the fingertip on the operation surface 14. Because of the above, it is possible to determine the value of "a" component and the radius "r" in advance.

In the above configuration, the value of "b" component may be calculated from the equation of the predetermined circle set at S310, S510 in the fourth and fifth embodiments, and thereafter, based on the calculated value of "b" component, the controller 16 may perform S320, S520, S530, and S540.

In the second embodiment, the estimation lines 50, 60 are set based on the fixed point where the upper limb of the user is fixed to the center console 40. A setting manner like the setting manner of the second embodiment may be used (adopted) when the estimation lines 50, 60 are set in the fourth and fifth embodiments. Furthermore, a setting manner like the setting manner of the third embodiment may be used (adopted) when the estimation lines 50, 60 are set in the fourth and fifth embodiments.

The input apparatus can be provided in various forms. For example, according to a first aspect of the present disclosure, an input apparatus for, in response to a user's sliding operation on an operation surface, inputting a coordinate point in the operation surface to move a pointing image, which is displayed on a display screen of a display device, to a target button image from among multiple button images comprises an acquisition device, a characteristic setting device, a correction device and an output device. The acquisition device acquires the coordinate point in the operation surface, which is inputted by the user's sliding operation on the operation surface. The characteristic setting device sets, as a characteristic line, a tendency of trace of the coordinate point in the user's sliding operation directed to a lateral direction or a longitudinal direction of the operation surface. The correction device corrects the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction. The output device outputs the coordinate point corrected by the correction device to the display device, as an output-coordinate for moving the pointing image.

According to the above input apparatus, when the user operates the input apparatus by performing the sliding operation in order to move the pointing image in the lateral direction or the longitudinal direction and inputs the trace of the coordinate point directed to the lateral direction or the longitudinal direction to the input apparatus, the correction device corrects the coordinate point so that the trace of the coordinate point is corrected to be the horizontal line or the vertical line. Then, the output device outputs the corrected coordinate point as the output-coordinate. Accordingly, even if the user's sliding operation in the lateral direction or the longitudinal direction is not movement along the horizontal line or the vertical line, the pointing image displayed on the display device has movement along the horizontal line or the vertical line. Therefore, the movement of the pointing image to an outside of the multiple button images, which have the target button image and are aligned in the lateral direction or the horizontal direction, is prevented, and as a result, the input apparatus enables the user to accurately select the target button image. Additionally, since the user intention to move the pointer image along the multiple button images, which have the target button image and are aligned in the lateral direction or the horizontal direction, substantially matches the movement of the pointing image on the display screen, the user strange feeling about the movement of the pointing image can be minimized.

According to a second aspect, the input apparatus may be configured as follows. In cases where the correction device corrects the coordinate point so that the trace of the coordinate point directed to the lateral direction is corrected to be the horizontal line extending in the lateral direction, the characteristic setting device (i) sets the characteristic line for the lateral direction so that the characteristic line for the lateral direction passes through the coordinate point first acquired by the acquisition device, and (ii) sets a belt-shaped characteristic belt for the lateral direction so that the characteristic belt for the lateral direction contains the characteristic line for the lateral direction and has a predetermined width. The correction device includes a determination portion and a changing portion. Each time the coordinate point is acquired by the acquisition device after the characteristic belt for the lateral direction has been set, the determination portion (i) compares the acquired coordinate point with the characteristic belt for the lateral direction and (ii) determines whether or not the acquired coordinate point is within the characteristic belt for the lateral direction. When the determination portion determines that the acquired coordinate point is within the characteristic belt for the lateral direction, the changing portion changes the acquired coordinate point so that the trace of the coordinate point follows the horizontal line.

According to a third aspect, the input apparatus may be configured as follows. In cases where the correction device corrects the coordinate point so that the trace of the coordinate point in the longitudinal direction is corrected to be the vertical line extending in the longitudinal direction, the characteristic setting device (i) sets the characteristic line for the longitudinal direction so that the characteristic line for the longitudinal direction passes through the coordinate point first acquired by the acquisition device, and (ii) sets a belt-shaped characteristic belt for the longitudinal direction so that the characteristic belt for the longitudinal direction contains the characteristic line for the longitudinal direction and has a predetermined width. The correction device includes a determination portion and a changing portion. Each time the coordinate point is acquired by the acquisition device after the characteristic belt for the longitudinal direction has been set, the determination portion (i) compares the acquired coordinate point with the characteristic belt for the longitudinal direction, and (ii) determines whether or not the acquired coordinate point is within the characteristic belt for the longitudinal direction. When the determination portion determines that the acquired coordinate point is within the characteristic belt for the longitudinal direction, the changing portion changes the acquired coordinate point so that the trace of the coordinate point follows the vertical line.

According to a fourth aspect, the input apparatus may be configured as follows. in cases where the correction device corrects the coordinate point so that (i) the trace of the coordinate point in the lateral direction is corrected to be the horizontal line extending in the lateral direction and (ii) the trace of the coordinate point in the longitudinal direction is corrected to be the vertical line extending in the longitudinal direction, the characteristic setting device (i) sets the characteristic line for the lateral direction and the characteristic line for the longitudinal direction so that the characteristic line for the lateral direction and the characteristic line for the longitudinal direction pass through the coordinate point first acquired by the acquisition device, and (ii) sets a belt-shaped characteristic belt for the lateral direction and a belt-shaped characteristic belt for the longitudinal direction so that (i) the characteristic belt for the lateral direction contains the characteristic line for the lateral direction and has a predetermined width, and (ii) the characteristic belt for the longitudinal direction contains the characteristic line for the longitudinal direction and has a predetermined width. The correction device includes a determination portion and a changing portion. Each time the coordinate point is acquired by the acquisition device after the characteristic belt for the lateral direction and the characteristic belt for the longitudinal direction have been set, the determination portion (i) compares the acquired coordinate point with the characteristic belt for the lateral direction and the characteristic belt for the longitudinal direction, and (ii) determines whether or not the acquired coordinate point is within the characteristic belt for the lateral direction or the characteristic belt for the longitudinal direction. When the determination portion determines that the acquired coordinate point is within the characteristic belt for the lateral direction, the changing portion changes the acquired coordinate point so that the trace of the coordinate point follows the horizontal line. When the determination portion determines that the acquired coordinate point is within the characteristic belt for the longitudinal direction, the changing portion changes the acquired coordinate point so that the trace of the coordinate point follows the vertical line.

The inventors of the present application observed the user's sliding operation on the operation surface in detail and revealed that when the user slides his or her fingertip in the horizontal or longitudinal direction on the operation surface, the trace of the sliding has a specified tendency. From these points, it can be estimated that when the trace of the sliding, i.e., the trace of coordinate point inputted to the operation surface, follows this tendency, the user intends to move the pointing image along the horizontal line or the vertical line.

According to the above input apparatus, the tendency of the trace of the inputted coordinate point when the user's sliding operation on the operation surface is directed to the lateral direction or the longitudinal direction of the operation surface is set as the characteristic belt for the lateral direction or the longitudinal direction by the characteristic setting device. Thereafter, each time the coordinate point is inputted, it is determined whether or not this coordinate point is within the characteristic belt for the lateral direction or the longitudinal direction. Because of this, it is possible to estimate whether or not the user intends to move the pointing image along the horizontal line or the vertical line. When the acquired coordinate point is within the characteristic belt for the lateral direction or the characteristic belt for the longitudinal direction, the changing portion of the coordinate point so that the trace of the coordinate point becomes the horizontal line or the vertical line. Accordingly, the pointing image moves along the horizontal line or the vertical line. Therefore, when the user intends to move the pointing image along the horizontal line or the vertical line, it is possible to surely move the pointing image along the horizontal line or the vertical line.

According to a fifth aspect, the input apparatus may further comprise a prohibiting device that prohibits the changing portion from changing the coordinate point when the determination portion determines that a next-acquired coordinate point, which is the coordinate point acquired next after the characteristic belt for the lateral direction and the characteristic belt for the longitudinal direction have been set, is located in an overlapping region, which is the region where the characteristic belt for the lateral direction and the characteristic belt for the longitudinal direction overlap each other.

In cases where the coordinate point is periodically acquired, the distance between the position of the coordinate point and the position of the next-acquired coordinate point may be small, and the position of the next-acquired coordinate point may be within the region where the characteristic belt for the lateral direction and the characteristic belt for the longitudinal direction overlap with each other. In these cases, it becomes difficult to estimate the user intention.

In view of this, when the next-acquired coordinate point is within the overlapping region of the two characteristic belts, the prohibiting device prohibits the change in the coordinate point. Accordingly, the careless change in the coordinate point with the unknown user intention can be prevented.

According to a sixth aspect, the input apparatus may be configured as follows. An overlapping region, which is a region where the characteristic belt for the lateral direction and the characteristic belt for the longitudinal direction overlap each other, is divided in four areas by four partition lines, the four partition lines extending from a point of intersection between the characteristic line for the lateral direction and the characteristic line for the longitudinal direction to four corners of the overlapping region. Two of the four areas are first change areas, which are located on opposite sides of the characteristic line for the longitudinal direction. The other two of the four areas are second change areas, which are located on opposite sides of the characteristic line for the lateral direction, are second change areas. When the coordinate point is within the first change areas, the changing portion changes the coordinate point so that the trace of the coordinate point follows the horizontal line. When the coordinate point is within the second change areas, the changing portion changes the coordinate point so that the trace of the coordinate point follows the vertical line.

In the above configuration, the overlapping region of the two characteristic belts has the first change area and the second change areas. When the coordinate point is within the first change areas, the changing portion changes the coordinate point so that the trace of the coordinate point follows the horizontal line. When the coordinate point is within the second change areas, the changing portion changes the coordinate point so that the trace of the coordinate point follows the vertical line. According to this configuration, even when the next coordinate point is located in the overlapping region of the two characteristic belts, it is possible to estimate the user-intended operation direction and it is possible to accurately change the coordinate point.

According to a seventh aspect, the input apparatus may be configured as follows. When the determination portion determines that the coordinate point is located out of the characteristic belt for the lateral direction, the characteristic setting device again sets the characteristic line for the lateral direction as the newly-set characteristic line for the lateral direction so that the newly-set characteristic line for the lateral direction passes through the coordinate point located out of the previously characteristic belt for the lateral direction.

According to an eighth aspect, the input apparatus may be configured as follows. When the determination portion determines that the coordinate point is located out of the characteristic belt for the longitudinal direction, the characteristic setting device again sets the characteristic line for the longitudinal direction as the newly-set characteristic line for the longitudinal direction so that the newly-set characteristic line for the longitudinal direction passes through the coordinate point located out of the characteristic belt for the longitudinal direction.

According to a ninth aspect, the input apparatus may be configured as follows. When the determination portion determines that the coordinate point is located out of both of the characteristic belt for the lateral direction and the characteristic belt for the longitudinal direction, the characteristic setting device again sets (i) the characteristic line for the lateral direction as the newly-set characteristic line for the lateral direction so that the newly-set characteristic line for the lateral direction passes through the coordinate point located out of the characteristic belt for the lateral direction, and (ii) the characteristic line for the longitudinal direction as the newly-set characteristic line for the longitudinal direction so that the newly-set characteristic line for the longitudinal direction passes through the coordinate point located out of the characteristic belt for the longitudinal direction.

According to the above configurations, even when the coordinate point is located out of the set characteristic belt, the newly-set characteristic belt enables the estimation of the user intention of the movement, of the pointing image in the lateral direction or the longitudinal direction.

According to a tenth aspect, the input apparatus may be configured as follows. The correction device includes a coordinate transformation portion. In cases where the correction device corrects the coordinate point so that the trace of the coordinate point follows the horizontal line, (i) the characteristic setting device sets the characteristic line for the lateral direction so that the characteristic line for the lateral direction passes through the coordinate point acquired by the acquisition device and (ii) the coordinate transformation portion corrects the acquired coordinate point by performing coordinate transformation on the acquired coordinate point in the vertical direction so that the characteristic line for the lateral direction becomes a line along the horizontal line.

According to an eleventh aspect, the input apparatus may be configured as follows. The correction device includes a coordinate transformation portion. In cases where the correction device corrects the coordinate point so that the trace of the coordinate point follows the vertical line, (i) the characteristic setting device sets the characteristic line for the longitudinal direction so that the characteristic line for the longitudinal direction passes through the coordinate point acquired by the acquisition device and (ii) the coordinate transformation portion corrects the acquired coordinate point by performing coordinate transformation on the acquired coordinate point in the lateral direction so that the characteristic line for the longitudinal direction becomes a line along the horizontal line.

According to the above configurations, the coordinate transformation device corrects the acquired coordinate point by performing the coordinate transformation in the longitudinal direction or the lateral direction so that (i) the characteristic line for the lateral direction or the longitudinal direction becomes a line along the horizontal line or the vertical line and (ii) the trace of the acquired coordinate point follows the horizontal line or the vertical line. The coordinate point obtained in this way can move the pointing image along the horizontal line or the vertical line. Moreover, according to the above configuration, since the correction to the coordinate point is automatically made by the coordinate transformation, it is unnecessary to determine whether or not the coordinate point follows the characteristic line each time the coordinate point is acquired by the acquisition device. Therefore, with a simple configuration, it is possible to make the trace of the coordinate point follow the horizontal line or the vertical line.

According to a twelfth aspect, the input apparatus may be configured as follows. The operation surface is arranged on a structure body in a vehicle compartment. The input apparatus further comprises a state detection device configured to detect a fixed point, which is a point on which an arm of the user who operates the operation surface is fixed. Based on the fixed point detected by the state detection device, the characteristic setting section sets one of the characteristic line for the lateral direction and the characteristic line for the longitudinal, the one being the characteristic line to be set.

The inventors of the present application have found that the characteristic line for the lateral direction and the characteristic line for the longitudinal direction vary depending on the fixed point, which is a point where the upper limb of the user is fixed to a structure body in the vehicle. According to the above input apparatus, even when the tendency of the user sliding operation is changed due to a change in the fixed point of the user's upper limb to the structure body in the vehicle, it is possible to move the pointing image along the horizontal line or the vertical line.

According to a thirteenth aspect, the input apparatus may be configured as follows. As long as the fixed point is not detected by the state detection device, the correction device does not correct the coordinate point. According to this configuration, the careless correction to the coordinate point based on the characteristic line can be prevented.

According to a fourteenth aspect, the input apparatus may be configured as follows. The input apparatus further comprises: an operation instruction device configured to instruct the user to perform the sliding operation in a linear manner in the lateral direction or the longitudinal direction; a calculation device configured to calculates a setting parameter, which is a parameter for setting the characteristic line, from the trace of the coordinate point that is acquired by the acquisition device after the operation instruction device has instructed the user to perform the sliding operation; and a storing device configured to store the calculated setting parameter. Based on the setting parameter stored in the storage device, the characteristic setting device sets one of the characteristic line for the lateral direction and the characteristic line for the horizontal direction, the one being the characteristic line to be set.

According to the above configuration, the setting parameter for setting the characteristic line is calculated from the actual sliding operation of the user instructed by the operation instruction device. Based on the setting parameter, the characteristic line is set. Therefore, it is possible to improve accuracy of the characteristic line and it is possible to move the pointing image along the horizontal line or the vertical line.

The present disclosure is not limited the above embodiments and modifications thereof. That is, the above embodiments and modifications thereof may be modified in various ways without departing from the sprit and scope of the present disclosure.

What is claimed is:

1. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:
    an acquisition device configured to acquire the coordinate point in the operation surface;
    a characteristic setting device configured to, based on the coordinate point inputted in the user's sliding operation, estimate and set a characteristic line, which represents a tendency of trace of the coordinate point in the user's sliding operation directed to a lateral direction or a longitudinal direction of the operation surface;
    a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction; and an output device configured to output the coordinate point corrected by the correction device to the display device, as an output-coordinate for moving the pointing image; wherein the characteristic setting device sets a circular arc passing through the coordinate point that is first inputted in the operation surface in the user's sliding operation and first acquired by the acquisition device, and sets the characteristic line to a straight line that extends from the first-inputted coordinate point on the circular arc to the center of the circular arc; and the correction device corrects the coordinate point with reference to the straight line, which extends from the first-inputted coordinate point on the circular arc to the center of the circular arc, wherein: in cases where the correction device corrects the coordinate point so that the trace of the coordinate point directed to the lateral direction is corrected to be the horizontal line extending in the lateral direction, the characteristic setting device sets the characteristic line for the lateral direction so that the characteristic line for the lateral direction passes through the coordinate point first acquired by the acquisition device, and sets a belt-shaped characteristic belt for the lateral direction so that the characteristic belt for the lateral direction contains the characteristic line for the lateral direction and has a predetermined width; and the correction device includes: a determination portion configured to, each time the coordinate point is acquired by the acquisition device after the characteristic belt for the lateral direction has been set, compare the acquired coordinate point with the characteristic belt for the lateral direction and determine whether or not the acquired coordinate point is within the characteristic belt for the lateral direction; and a changing portion configured to, when the determination portion determines that the acquired coordinate point is within the characteristic belt for the lateral direction, change the acquired coordinate point so that the trace of the coordinate point follows the horizontal line.

2. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:

an acquisition device configured to acquire the coordinate point in the operation surface;

a characteristic setting device configured to, based on the coordinate point inputted in the user's sliding operation, estimate and set a characteristic line, which represents a tendency of trace of the coordinate point in the user's sliding operation directed to a lateral direction or a longitudinal direction of the operation surface;

a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction; and an output device configured to output the coordinate point corrected by the correction device to the display device, as an output-coordinate for moving the pointing image; wherein the characteristic setting device sets a circular arc passing through the coordinate point that is first inputted in the operation surface in the user's sliding operation and first acquired by the acquisition device, and sets the characteristic line to a straight line that extends from the first-inputted coordinate point on the circular arc to the center of the circular arc; and the correction device corrects the coordinate point with reference to the straight line, which extends from the first-inputted coordinate point on the circular arc to the center of the circular arc, wherein: in cases where the correction device corrects the coordinate point so that the trace of the coordinate point in the longitudinal direction is corrected to be the vertical line extending in the longitudinal direction, the characteristic setting device sets the characteristic line for the longitudinal direction so that the characteristic line for the longitudinal direction passes through the coordinate point first acquired by the acquisition device, and sets a belt-shaped characteristic belt for the longitudinal direction so that the characteristic belt for the longitudinal direction contains the characteristic belt for the longitudinal direction and has a predetermined width; and the correction device includes: a determination portion configured to, each time the coordinate point is acquired by the acquisition device after the characteristic belt for the longitudinal direction has been set, compare the acquired coordinate point with the characteristic belt for the longitudinal direction, and determine whether or not the acquired coordinate point is within the characteristic belt for the longitudinal direction;

and a changing portion configured to, when the determination portion determines that the acquired coordinate point is within the characteristic belt for the longitudinal direction, change the acquired coordinate point so that the trace of the coordinate point follows the vertical line.

3. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:

an acquisition device configured to acquire the coordinate point in the operation surface;

a characteristic setting device configured to, based on the coordinate point inputted in the user's sliding operation, estimate and set a characteristic line, which represents a tendency of trace of the coordinate point in the user's sliding operation directed to a lateral direction or a longitudinal direction of the operation surface;

a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction; and an output device configured to output the coordinate point corrected by the correction device to the display device, as an output-coordinate for moving the pointing image; wherein the characteristic setting device sets a circular arc passing through the coordinate point that is first inputted in the operation surface in the user's sliding operation and first acquired by the acquisition device, and sets the characteristic line to a straight line that extends from the first-inputted coordinate point on the circular arc to the center of the circular arc; and the correction device corrects the coordinate point with reference to the straight line, which extends from the first-inputted coordinate point on the circular arc to the center of the circular arc, wherein: in cases where the correction device corrects the coordinate point so that the trace of the coordinate point in the lateral direction is corrected to be the horizontal line extending in the lateral direction and (ii) the trace of the coordinate point in the longitudinal direction is corrected to be the vertical line extending in the longitudinal direction, the characteristic setting device sets the characteristic line for the lateral direction and the characteristic line for the longitudinal direction so that the characteristic line for the lateral direction and the characteristic line for the longitudinal direction pass through the coordinate point first acquired by the acquisition device, and sets a belt-shaped characteristic belt for the lateral direction and a belt-shaped characteristic belt for the longitudinal direction so that the characteristic belt for the lateral direction contains the characteristic line for the lateral direction and has a predetermined width, and the characteristic belt for the longitudinal direction contains the characteristic line for the longitudinal direction and has a predetermined width; and the correction device includes: a determination portion configured to, each time the coordinate point is acquired by the acquisition device after the characteristic belt for the lateral direction and the characteristic belt for the longitudinal direction have been set, compare the acquired coordinate point with the characteristic belt for the lateral direction and the characteristic belt for the longitudinal direction, and determine whether or not the acquired coordinate point is within the characteristic belt for the lateral direction or the characteristic belt for the longitudinal direction; and a changing portion configured to, when the determination portion determines that the acquired coordinate point is within the characteristic belt for the lateral direction, change the acquired coordinate point so that the trace of the coordinate point follows the horizontal line, and when the determination portion determines that the acquired coordinate point is within the characteristic belt for the longitudinal direction, change the acquired coordinate point so that the trace of the coordinate point follows the vertical line.

4. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:

an acquisition device configured to acquire the coordinate point in the operation surface;

a characteristic setting device configured to set, as a characteristic line, a tendency of trace of the coordinate point in the user's sliding operation directed to a lateral direction or a longitudinal direction of the operation surface;

a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction; and an output device configured to output the coordinate point corrected by the correction device to the display device, as an output-coordinate for moving the pointing image; wherein in cases where the correction device corrects the coordinate point so that the trace of the coordinate point in the lateral direction is corrected to be the horizontal line extending in the lateral direction and the trace of the coordinate point in the longitudinal direction is corrected to be the vertical line extending in the longitudinal direction, the characteristic setting device sets the characteristic line for the lateral direction and the characteristic line for the longitudinal direction so that the characteristic line for the lateral direction and the characteristic line for the longitudinal direction pass through the coordinate point first acquired by the acquisition device, and sets a belt-shaped characteristic belt for the lateral direction and a belt-shaped characteristic belt for the longitudinal direction so that the characteristic belt for the lateral direction contains the characteristic line for the lateral direction and has a predetermined width, and the characteristic belt for the longitudinal direction contains the characteristic line for the longitudinal direction and has a predetermined width; and the correction device includes: a determination portion configured to, each time the coordinate point is acquired by the acquisition device after the characteristic belt for the lateral direction and the characteristic belt for the longitudinal direction have been set, compare the acquired coordinate point with the characteristic belt for the lateral direction and the characteristic belt for the longitudinal direction, and determine whether or not the acquired coordinate point is within the characteristic belt for the lateral direction or the characteristic belt for the longitudinal direction; and a changing portion configured to, when the determination portion determines that the acquired coordinate point is within the characteristic belt for the lateral direction, change the acquired coordinate point so that the trace of the coordinate point follows the horizontal line, and when the determination portion determines that the acquired coordinate point is within the characteristic belt for the longitudinal direction, change the acquired coordinate point so that the trace of the coordinate point follows the vertical line; wherein a prohibiting device configured to prohibit the changing portion from changing the coordinate point when the determination portion determines that a next-acquired coordinate point, which is the coordinate point acquired next after the characteristic belt for the lateral direction and the characteristic belt for the longitudinal direction have been set, is located in an overlapping region, which is the region where the characteristic belt for the lateral direction and the characteristic belt for the longitudinal direction overlap each other.

5. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:

an acquisition device configured to acquire the coordinate point in the operation surface;

a characteristic setting device configured to set, as a characteristic line, a tendency of trace of the coordinate point in the user's sliding operation directed to a lateral direction or a longitudinal direction of the operation surface;

a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction; and an output device configured to output the coordinate point corrected by the correction device to the display device, as an output-coordinate for moving the pointing image; wherein in cases where the correction device corrects the coordinate point so that the trace of the coordinate point in the lateral direction is corrected to be the horizontal line extending in the lateral direction and the trace of the coordinate point in the longitudinal direction is corrected to be the vertical line extending in the longitudinal direction, the characteristic setting device sets the characteristic line for the lateral direction and the characteristic line for the longitudinal direction so that the characteristic line for the lateral direction and the characteristic line for the longitudinal direction pass through the coordinate point first acquired by the acquisition device, and sets a belt-shaped characteristic belt for the lateral direction and a belt-shaped characteristic belt for the longitudinal direction so that the characteristic belt for the lateral direction contains the characteristic line for the lateral direction and has a predetermined width, and the characteristic belt for the longitudinal direction contains the characteristic line for the longitudinal direction and has a predetermined width; and the correction device includes: a determination portion configured to, each time the coordinate point is acquired by the acquisition device after the characteristic belt for the lateral direction and the characteristic belt for the longitudinal direction have been set, compare the acquired coordinate point with the characteristic belt for the lateral direction and the characteristic belt for the longitudinal direction, and determine whether or not the acquired coordinate point is within the characteristic belt for the lateral direction or the characteristic belt for the longitudinal direction; and a changing portion configured to, when the determination portion determines that the acquired coordinate point is within the characteristic belt for the lateral direction, change the acquired coordinate point so that the trace of the coordinate point follows the horizontal line, and when the determination portion determines that the acquired coordinate point is within the characteristic belt for the longitudinal direction, change the acquired coordinate point so that the trace of the coordinate point follows the vertical line; wherein an overlapping region, which is a region where the characteristic belt for the lateral direction and the characteristic belt for the longitudinal direction overlap each other, is divided in four areas by four partition lines, the four partition lines extending from a point of intersection between the characteristic line for the lateral direction and the characteristic line for the longitudinal direction to four corners of the overlapping region; two of the four areas are first change areas, which are located on opposite sides of the characteristic line for the longitudinal direction; the other two of the four areas are second change areas, which are located on opposite sides of the characteristic line for the lateral direction; when the coordinate point is within the first change areas, the changing portion changes the coordinate point so that the trace of the coordinate point follows the horizontal line; and when the coordinate point is within the second change areas, the changing portion changes the coordinate point so that the trace of the coordinate point follows the vertical line.

6. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:
an acquisition device configured to acquire the coordinate point in the operation surface;
a characteristic setting device configured to set, as a characteristic line, a tendency of trace of the coordinate point in the user's sliding operation directed to a lateral direction or a longitudinal direction of the operation surface;
a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction; and
an output device configured to output the coordinate point corrected by the correction device to the display device, as an output-coordinate for moving the pointing image; wherein
in cases where the correction device corrects the coordinate point so that the trace of the coordinate point directed to the lateral direction is corrected to be the horizontal line extending in the lateral direction, the characteristic setting device
sets the characteristic line for the lateral direction so that the characteristic line for the lateral direction passes through the coordinate point first acquired by the acquisition device, and
sets a belt-shaped characteristic belt for the lateral direction so that the characteristic belt for the lateral direction contains the characteristic line for the lateral direction and has a predetermined width; and
the correction device includes:
a determination portion configured to, each time the coordinate point is acquired by the acquisition device after the characteristic belt for the lateral direction has been set,
compare the acquired coordinate point with the characteristic belt for the lateral direction and
determine whether or not the acquired coordinate point is within the characteristic belt for the lateral direction; and
a changing portion configured to, when the determination portion determines that the acquired coordinate point is within the characteristic belt for the lateral direction,
change the acquired coordinate point so that the trace of the coordinate point follows the horizontal line; wherein
when the determination portion determines that the coordinate point is located out of the characteristic belt for the lateral direction, the characteristic setting device newly sets a characteristic line for the lateral direction so that the newly-set characteristic line for the lateral direction passes through the coordinate point located out of the previously-set characteristic belt for the lateral direction.

7. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:
an acquisition device configured to acquire the coordinate point in the operation surface;
a characteristic setting device configured to set, as a characteristic line, a tendency of trace of the coordinate point in the user's sliding operation directed to a lateral direction or a longitudinal direction of the operation surface;
a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction; and
an output device configured to output the coordinate point corrected by the correction device to the display device, as an output-coordinate for moving the pointing image; wherein
in cases where the correction device corrects the coordinate point so that the trace of the coordinate point in the longitudinal direction is corrected to be the vertical line extending in the longitudinal direction, the characteristic setting device
sets the characteristic line for the longitudinal direction so that the characteristic line for the longitudinal direction passes through the coordinate point first acquired by the acquisition device, and
sets a belt-shaped characteristic belt for the longitudinal direction so that the characteristic belt for the longitudinal direction contains the characteristic belt for the longitudinal direction and has a predetermined width; and
the correction device includes:
a determination portion configured to, each time the coordinate point is acquired by the acquisition device after the characteristic belt for the longitudinal direction has been set,
compare the acquired coordinate point with the characteristic belt for the longitudinal direction, and
determine whether or not the acquired coordinate point is within the characteristic belt for the longitudinal direction; and a changing portion configured to, when the determination portion determines that the acquired coordinate point is within the characteristic belt for the longitudinal direction, change the acquired coordinate point so that the trace of the coordinate point follows the vertical line; wherein when the determination portion determines that the coordinate point is located out of the characteristic belt for the longitudinal direction, the characteristic setting device newly sets the characteristic line for the longitudinal direction so that the newly-set characteristic line for the longitudinal direction passes through the coordinate point located out of the previously-set characteristic belt for the longitudinal direction.

8. An input apparatus for, in response to a user's sliding operation on an operation surface, inputting a coordinate point in the operation surface to move a pointing image, which is displayed on a display screen of a display device, to a target button image from among a plurality of button images, the input apparatus comprising:

an acquisition device configured to acquire the coordinate point in the operation surface;

a characteristic setting device configured to set, as a characteristic line, a tendency of trace of the coordinate point in the user's sliding operation directed to a lateral direction or a longitudinal direction of the operation surface;

a correction device configured to correct the coordinate point with reference to the set characteristic line so that the trace of the coordinate point directed to the lateral direction or the longitudinal direction of the operation surface acquired by the acquisition device is corrected to be a horizontal line extending in the lateral direction or a vertical line extending in the longitudinal direction;

and an output device configured to output the coordinate point corrected by the correction device to the display device, as an output-coordinate for moving the pointing image; wherein in cases where the correction device corrects the coordinate point so that the trace of the coordinate point in the lateral direction is corrected to be the horizontal line extending in the lateral direction and the trace of the coordinate point in the longitudinal direction is corrected to be the vertical line extending in the longitudinal direction, the characteristic setting device sets the characteristic line for the lateral direction and the characteristic line for the longitudinal direction so that the characteristic line for the lateral direction and the characteristic line for the longitudinal direction pass through the coordinate point first acquired by the acquisition device, and sets a belt-shaped characteristic belt for the lateral direction and a belt-shaped characteristic belt for the longitudinal direction so that the characteristic belt for the lateral direction contains the characteristic line for the lateral direction and has a predetermined width, and the characteristic belt for the longitudinal direction contains the characteristic line for the longitudinal direction and has a predetermined width; and the correction device includes: a determination portion configured to, each time the coordinate point is acquired by the acquisition device after the characteristic belt for the lateral direction and the characteristic belt for the longitudinal direction have been set, compare the acquired coordinate point with the characteristic belt for the lateral direction and the characteristic belt for the longitudinal direction, and determine whether or not the acquired coordinate point is within the characteristic belt for the lateral direction or the characteristic belt for the longitudinal direction; and a changing portion configured to, when the determination portion determines that the acquired coordinate point is within the characteristic belt for the lateral direction, change the acquired coordinate point so that the trace of the coordinate point follows the horizontal line, and when the determination portion determines that the acquired coordinate point is within the characteristic belt for the longitudinal direction, change the acquired coordinate point so that the trace of the coordinate point follows the vertical line; wherein when the determination portion determines that the coordinate point is located out of both of the characteristic belt for the lateral direction and the characteristic belt for the longitudinal direction, the characteristic setting device newly sets a characteristic line for the lateral direction as the newly-set characteristic line for the lateral direction so that the newly-set characteristic line for the lateral direction passes through the coordinate point located out of the previously-set characteristic belt for the lateral direction, and newly sets a characteristic line for the longitudinal direction as the newly-set characteristic line for the longitudinal direction so that the newly-set characteristic line for the longitudinal direction passes through the coordinate point located out of the previously-set characteristic belt for the longitudinal direction.

9. The input apparatus according to claim 1, wherein:

the operation surface is arranged on a structure body in a vehicle compartment, the input apparatus further comprising:

a state detection device configured to detect a fixed point, which is a point on which an arm of the user who operates the operation surface is fixed, wherein:

based on the fixed point detected by the state detection device, the characteristic setting section sets one of the characteristic line for the lateral direction and the characteristic line for the longitudinal as the characteristic line to be set.

10. The input apparatus according to claim 9, wherein:

as long as the fixed point is not detected by the state detection device, the correction device does not correct the coordinate point.

11. The input apparatus according to claim 1, further comprising: an operation instruction device configured to instruct the user to perform the sliding operation in a linear manner in the lateral direction or the longitudinal direction; a calculation device configured to calculates a setting parameter, which is a parameter for setting the characteristic line, from the trace of the coordinate point that is acquired by the acquisition device after the operation instruction device has instructed the user to perform the sliding operation; and a storing device configured to store the calculated setting parameter, wherein: based on the setting parameter stored in the storage device, the characteristic setting device sets one of the characteristic line for the lateral direction and the characteristic line for the horizontal direction as the characteristic line to be set.

12. The input apparatus according to claim 1, wherein the correction device corrects the coordinate point with reference to the set characteristic line so that the trace of the coordinate point directed to the lateral direction or the longitudinal direction is always corrected to be the horizontal line or the vertical line.

13. The input apparatus according to claim 1, wherein the center of the circular arc is located at a wrist of the user.

* * * * *